(12) United States Patent
Zhang et al.

(10) Patent No.: US 7,173,978 B2
(45) Date of Patent: Feb. 6, 2007

(54) METHOD AND SYSTEM FOR TURBO ENCODING IN ADSL

(76) Inventors: Song Zhang, 32 Sherk Crescent, Kanata, Ontario (CA) K2K 2L3; Bin Li, 1316 Carling Avenue, Apt. 1908, Ottawa, Ontario (CA) K1Z 7L1; Andrew Deczky, 732 Highland Avenue, Ottawa, Ontario (CA) K0A 2K7; Alberto Ginesi, 111 Covington Place, Nepean, Ontario (CA) K2G 6B6

( * ) Notice: Subject to any disclaimer, the term of this patent is extended or adjusted under 35 U.S.C. 154(b) by 782 days.

(21) Appl. No.: 09/912,068

(22) Filed: Jul. 23, 2001

(65) Prior Publication Data

US 2002/0101915 A1 Aug. 1, 2002

(30) Foreign Application Priority Data

Jul. 21, 2000 (CA) .................................. 2314404
Aug. 11, 2000 (CA) .................................. 2315952

(51) Int. Cl.
*H04L 27/36* (2006.01)
(52) U.S. Cl. ...................... 375/298; 375/222; 375/265
(58) Field of Classification Search ................ 375/148, 375/222, 261, 265, 285, 295, 260, 298; 714/755, 714/759, 790, 792, 794, 810
See application file for complete search history.

(56) References Cited

U.S. PATENT DOCUMENTS

| | | | |
|---|---|---|---|
| 5,233,629 A * | 8/1993 | Paik et al. .................. 375/262 |
| 5,408,499 A * | 4/1995 | Sasaki ......................... 375/286 |
| 5,852,389 A | 12/1998 | Kumar et al. | |
| 5,970,098 A * | 10/1999 | Herzberg ..................... 375/264 |
| 6,088,387 A | 7/2000 | Gelblum et al. | |
| 6,374,386 B1 * | 4/2002 | Kim et al. .................. 714/786 |
| 6,473,878 B1 * | 10/2002 | Wei ............................. 714/755 |
| 6,553,539 B1 * | 4/2003 | Markarian et al. .......... 714/790 |
| 6,671,327 B1 * | 12/2003 | Jin ............................. 375/265 |

OTHER PUBLICATIONS

Williams, D.G., "Turbo product codes and their bandwidth efficiency"; Turbo Codes in Digital Broadcasting—Could It Double Capacity? (Ref. No. 1999/165), IEEE Colloquium on Nov. 22, 1999 pp. 6/1-629.*
John G. Proakis, "Digital Communications", third edition. 1995.*
Bahl et al., "Optimal Decoding of Linear Codes for Minimizing Symbol Error Rate," *IEEE Transactions on Information Theory*, IT-20:284-287 (1974).

(Continued)

*Primary Examiner*—Khanh Tran
(74) *Attorney, Agent, or Firm*—Merek, Blackmon & Voorhees, LLC

(57) ABSTRACT

In a coding system for asymmetric digital subscriber line (ADSL) communications, a method of encoding a sequence of information bits is provided comprising the steps of dividing the information bits into encoding bits and parallel bits; encoding the encoding bits to produce encoded bits; mapping the encoded bits and the parallel bits into first and second pulse amplitude modulation (PAM) signals; and generating a quadrature amplitude modulation (QAM) signal from these first and second PAM signals. This method overcomes the decoder complexity that would otherwise be required due to the large QAM constellations involved for ADSL communications.

44 Claims, 10 Drawing Sheets

OTHER PUBLICATIONS

Benedetto et al., "Parallel Concatenated Trellis Coded Modulation," *IEEE ICC96*, pp. 974-978 (1996).

Benedetto et al., "Serial Concatenation of Interleaved Codes: Performance Analysis, Design, and Iterative Decoding," *TDA Progress Report 42-126*, pp. 1-26, Aug. 15, 1996.

Berrou, C., "Near Optimum Error Error Correcting Coding And Decoding: Turbo-Codes," *IEEE Trans. Communications*, 44(10):1261-1271 (1996).

Chase, D., "A Class of Algorithms for Dcoding Block Cdes With Channel Measurment Information," *IEEE Transactions On Info. Theory*, IT-18(1):170-181 (1972).

Divsalar et al., "Turbo Codes for PCS Applications," *IEEE ICC95*, Jet Propulsion Laboratory, Cal Inst. Tech., pp. 54-59 (1995).

Divsalar et al., "Multiple Turbo Codes for Deep-Space Communications," *TDA Progress Report 42-121*, pp. 66-77, May 15, 1995.

Gallager, R.G., "Low-Density Parity-Check Codes," *IRE Transactions on Information Theory*, pp. 21-28 (1992).

Hagenauer et al., "A Viterbi Algorithm with Soft-Decision Outputs and its Applications," *IEEE Global Telecommunications Conference*, held Nov. 27-30, 1989, Dallas TX., pp. 1680-1686.

Le Goff et al., "Turbo-Codes and High Spectral Efficiency Modulation," *IEEE ICC94*, pp. 645-649, (1994).

MacKay, D., "Good Error-Correcting Codes Based on Very Sparse Matrices," *IEEE Transactions on Info. Theory*, 45(2):399-431 (1999).

MacKay et al., "Near Shannon limit performance of low density parity check codes," *Electronics Letters*, 32(18):1645-1646 (1996).

Pyndiah, R.M., "Near-Optimum Decoding of Product Codes: Block Turbo Codes," *IEEE Transactions on Communications*, 46(8):1003-1010 (1998).

Robertson, P., "Illuminating the Structure of Code and Decoder of Parallel Concatenated Recursive Systematic (Turbo) Codes," *IEEE GLOBECOM94*, pp. 1298-1303 (1994).

Robertson et al., "Bandwith-Efficient Turbo Trellis-Coded Modulation Using Punctured Component Codes," *IEEE J. Selected Areas in Communications*, 16(2):206-218 (1998).

Ungerboeck, G., "Channel coding with Multilevel / Phase Signals," *IEEE Trans. Info. Theory*, IT-28(1):55-67 (1982).

"New Proposal of Turbo Codes for ADSL Modems," ITU Standard Collection, Study Group 15, Question 4/15, BA-020R1, Antwerp, Belgium, Jun. 19-23, 2000.

\* cited by examiner

METHOD AND SYSTEM FOR TURBO ENCODING IN ADSL

CROSS-REFERENCES TO RELATED APPLICATIONS

Not Applicable

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

The invention relates to the field of asymmetric digital subscriber line (ADSL) communication systems. More specifically, the invention relates to a system and method for encoding signals applied to ADSL.

Channel coding methods are used in order to design reliable digital communication systems. Although channel coding improves error performance through the mapping of input sequences into code sequences, this adds redundancy and memory to the transmission. Shannon's Theorem holds that small error rates are achievable provided that the rate of transmission is less than the capacity of the channel.

In the early 1990's, a very powerful channel coding scheme was developed which used concepts related to block and trellis codes. The encoding scheme used simple convolutional codes separated by interleaving stages to produce generally low rate block codes. Decoding was performed by decoding the convolutional encoders separately using a "soft" output Viterbi algorithm and sharing bit reliability information in an iterative manner. This new coding scheme was called "Turbo Coding" and it was found to be capable of near Shannon capacity performance as described in C. Berrou and A. Glavieux, "Near Optimum Error Correcting Coding And Decoding: Turbo-Codes", IEEE Trans. Commun., vol. COM-44, No. 10, October 1996, pp. 1261–1271.

In general, a turbo encoder is a combination of two simple encoders where the input is a block of M information bits. The two encoders generate parity symbols using simple recursive convolutional encoders each with a small number of states. The information bits are also transmitted uncoded. A key innovation of turbo encoders was the use of an interleaver which permutes the original M information bits before input to the second encoder. The permutation is generally such that input sequences for which the first encoder produces low-weight code-words will typically cause the second encoder to produce high-weight code-words. Thus, even though the constituent codes may be individually weak, the combination code is powerful. This resulting code has features that are similar to a random block code with M information bits. Random block codes are known to achieve Shannon-limit performance as M increases but with a corresponding increase in decoder complexity.

Turbo codes may achieve the performance of random codes (for large M) using an iterative decoding algorithm based on simple decoders that are individually matched to the constituent codes. In a typical turbo decoder, each constituent decoder generally sends a posteriori likelihood estimates of the decoded bits to the second decoder and uses the corresponding estimates from the second decoder as a priori likelihood estimates. The decoders generally use the maximum a posteriori (MAP) bitwise decoding algorithm which requires the same number of states as the well-known Viterbi algorithm. The turbo decoder iterates between the outputs of the two constituent decoders until reaching satisfactory convergence. The final output is a "hard" quantized version of the likelihood estimates of either of the decoders.

As turbo codes have a near Shannon limit, error correcting performance, they are of potential use in a wide range of telecommunications applications. As mentioned, turbo codes were originally proposed for binary modulation using two binary convolutional component codes separated by an interleaver. For moderate QAM (quadrature amplitude modulation) constellation modulation, bit-level turbo coded QAM and symbol-level turbo TCM (trellis coded modulation) have been proposed as described in P. Robertson and T. Worz, "Bandwidth-Efficient Turbo Trellis-Coded Modulation Using Punctured Component Codes", IEEE J-SAC, vol. 16, No. 2, February 1998, pp. 206–218; S. L. Goff, A. Glavieux and C. Berrou, "Turbo-Codes and High Spectral Efficiency Modulation", IEEE ICC94, pp. 645–649, 1994; and "New Proposal of Turbo Codes for ADSL Modems", ITU Standard Contribution, Study Group 15/4, BA-020R1, Antwerp, Belgium, Jun. 19–23, 2000.

Typically, bit-level turbo coded QAM combines the binary turbo codes with large constellation modulation using Gray mapping, whereas symbol-level turbo TCM uses TCM codes as component codes that are separated by a symbol-level interleaver.

A problem arises in the deployment of turbo codes in ADSL (asymmetric digital subscriber line) communication systems where these codes are combined with very large modulation constellations. These constellations may be as large as $2^{15}$ (32768) QAM symbols. For conventional bit-level turbo coded QAM using Gray mapping, the de-mapper (which calculates the soft information bits from the received constellation signal) requires an excessive number of computations. In addition, the turbo decoder's complexity (i.e., length) is proportional to the number of bits transmitted in one constellation symbol. Therefore, the overall receiver becomes very complicated. For symbol-level turbo TCM using two-dimensional or four-dimensional set partitioning mapping, the turbo decoder's length is independent of the number of bits transmitted in one constellation symbol, but its de-mapper still requires an excessive number of computations. Furthermore, the decoder uses a much more complicated symbol MAP decoder. Consequently, the very large constellation size used in ADSL systems makes both conventional bit-level turbo coded QAM and symbol-level turbo TCM very complicated to decode at the receiver end. In other words, conventional bit-level turbo coded QAM and symbol-level turbo TCM both have very high decoding complexity for large ADSL related constellations. These techniques are described in S. Benedetto, D. Divsalar, G. Montorsi and F. Pollara, "Parallel Concatenated Trellis Coded Modulation", IEEE ICC96, 1996, pp. 974–978; L. Bahl, J. Cocke, F. Jelinek and J. Raviv, "Optimum Decoding of Linear Codes for Minimizing Symbol Error Rate", IEEE Trans. Inform. Theory, vol. IT-20, pp. 284–287, March 1974; J. Hagenauer and P. Hoeher, "A Viterbi Algorithm with Soft-Decision Outputs and Its Application", IEEE GLOBECOM89, pp. 47.1.1–47.1.7, November 1989; D.

Divsalar, "Turbo Codes for PCS Applications", IEEE ICC95, pp. 54–59, 1996; P. Robertson, "Illuminating the Structure of Parallel Concatenated Recursive Systematic (TURBO) Codes", IEEE GLOBECOM94, pp. 1298–1303, November 1994; S. Benedetto, D. Divsalar, G. Montorsi and F. Pollara, "Parallel Concatenated Trellis Coded Modulation", IEEE ICC96, 1996, pp. 974–978; and G. Ungerboeck, "Channel Coding with Multilevel/Phase Signals", IEEE Trans. Inform. Theory, vol. IT-28, No. 1, January 1982, pp. 55–67.

A need therefore exists for a method and system that will allow for the effective use of turbo coding in ADSL communication systems.

BRIEF SUMMARY OF THE INVENTION

In accordance with this invention there is provided a method for the encoding sequence of information bits in a digital signal. The method comprises the steps of dividing the information bits into encoding bits and parallel bits; encoding the encoding bits to produce encoded bits; mapping the encoded bits and the parallel bits into first and second PAM signals; and generating a QAM signal from these first and second PAM signals. According to another aspect of the invention there is provided a coding system that implements the above-described method. The coding system generally includes parallel-to-serial transfer means, interleaver means, encoder means, puncturing means, mapper means, and mode control means. The coding system may be implemented by monitoring data that represents sequences of instructions which when executed cause the above-described method to be performed.

BRIEF DESCRIPTION OF THE DRAWINGS

The invention may best be understood by referring to the following description and accompanying drawings which illustrate the invention. In the drawings.

DETAILED DESCRIPTION OF THE INVENTION

Figure 1:
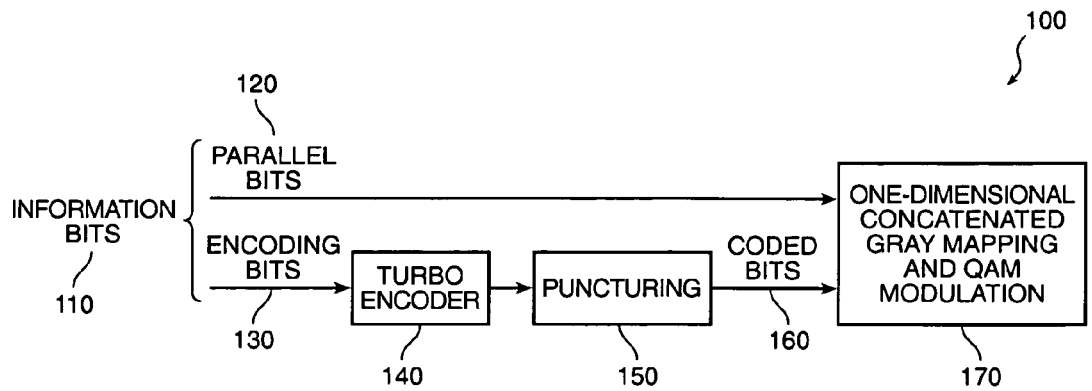
FIG. 1 is a block diagram of a turbo coding system in accordance with a preferred embodiment of the invention.

In the following description, numerous specific details are set forth to provide a thorough understanding of the invention. However, it is understood that the invention may be practiced without these specific details. In other instances, well-known software, circuits, structures and techniques have not been described or shown in detail in order not to obscure the invention. In the drawings, like numerals refer to like structures or processes.

The term asymmetric digital subscriber line (ADSL) is used herein to refer to a technology for transmitting digital information which simultaneously transports high bit-rate digital information downstream to a subscriber or customer, lower bit-rate data upstream from the subscriber, and analog voice typically via a twisted-wire-pair.

The term amplitude shift keying (ASK) is used herein to refer to a modulation technique that uses one signal of constant frequency, but varies the strength of the signal according to the state of the digital information to be conveyed.

The term binary phase shift keying (BPSK) is used herein to refer to a modulation technique wherein the phase of the RF carrier is shifted 180 degrees in accordance with a digital bit stream.

The term discrete multi-tone (DMT) is used herein to refer to a multicarrier transmission technique that uses a Fast Fourier Transform (FFT) and Inverse FFT (IFFT) to allocate the transmitted bits among many narrowband QAM modulated tones depending on the transport capacity of each tone.

The term "G.lite" is used herein to refer to a consumer-friendly splitter-less version of ADSL that typically offers downstream data rates of up to 1.5 Mbps and upstream date rates of up to 384 kbps.

The term "G.dmt" is used herein to refer to a second standard for ADSL that typically offers downstream data rates of up to 8 Mbps and upstream data rates of up to 1.5 Mbps. G.dmt requires the installation of a splitter at the consumer's premises.

The term "Gray code" is used herein to refer to a binary code in which consecutive decimal numbers are represented by binary expressions that differ in the state of one, and only one, bit.

The term low-density parity check (LDPC) code is used herein to refer to a binary code for which the parity check matrix is very sparse, having a small, fixed number of parity equations checking each bit, and each parity equation checks the same number of bits.

The term maximum a posteriori (MAP) decoder is used herein to refer to a maximum likelihood decoder.

The term pulse amplitude modulation (PAM) is used herein to refer to a modulation technique in which the amplitude of each pulse is controlled by the instantaneous amplitude of the modulating signal at the time of each pulse.

The term quadrature amplitude modulation (QAM) is used herein to refer to a passband modulation technique which represents information changes in carrier phase and amplitude (i.e., real and imaginary parts). QAM is a method of combining two amplitude-modulated (AM) signals into a single channel, thereby doubling the effective bandwidth. QAM is used with PAM in digital systems. In a QAM signal, there are two carriers, each having the same frequency but differing in phase by 90 degrees. The two modulated carriers are combined at the source of transmission. At the destination, the carriers are separated, the data is extracted from each, and then the data is combined into the original modulating information.

The term recursive systematic convolutional (RSC or SRC) code is used herein to refer to a code that takes the desired sequence to be transmitted as an input and produces an output sequence that contains the original signal plus a shifted, weighted version of it, which introduces redundancy. Its implementation is typically carried out in hardware using shift registers, which basically consist of registers (i.e., memory allocations) and a clock that controls the shifting of the data contained in the registers that is added to the original sequence to produce the output. The word "recursive" in the term RSC code refers to the presence of a feedback connection. The word "convolutional" in the term RSC code indicates that the code depends on the current bit sequence and the encoder state.

The term trellis coded modulation (TCM) is used herein to refer to a convolutional code that provides coding gain without increasing bandwidth.

Finally, the term "coding system" is used herein to refer to any machine for ADSL related encoding and decoding, including the circuitry, systems and arrangements described herein.

General Overview. The invention described herein provides a method and system for turbo coding in ADSL communication systems. It is an advantage of the invention that its de-mapper requires fewer computations than are required for a conventional de-mapper for bit-level coded QAM and symbol-level turbo TCM. It is a further advantage of the invention that its decoder is independent of the number of bits transmitted in the constellation signal. It is further advantage of the invention that the overall number of computations is less than that required for both bit-level and symbol-level turbo decoders. It is a further advantage of the invention that its mapping efficiently maximizes the minimum Euclidean distance of uncoded bits while providing good performance for turbo coded bits. It is a further advantage of the invention that not only does it have as good an error performance as conventional bit-interleaved turbo coded QAM and symbol-interleaved turbo TCM methods, but it also has low decoding complexity when compared with conventional bit-interleaved turbo coded QAM.

In general, the method for turbo coding comprises the following steps:

(a) Information bits are divided into two categories, encoding bits and parallel bits. The encoding bits are passed into a turbo encoder. The parallel bits bypass the turbo encoder. The encoder outputs are coded bits which consist of systematic bits and parity bits (i.e., either all parity bits or partial parity bits).

(b) The coded bits and parallel bits are mapped into two PAM signals. For small PAM, there are no parallel bits. The coded bits are used as least significant bits, and the parallel bits are used as the most significant bits. The number of coded bits to be mapped to PAM is preferably two for transmitting an even number of bits and preferably three for transmitting an odd number of bits. The mapping of coded bits and parallel bits to PAM signals is performed using concatenated Gray mapping where concatenated Gray mapping is a serial concatenation of an inner Gray mapping and an outer Gray mapping. The inner Gray mapping is used for the coded bits. The outer Gray mapping is used for the parallel bits.

(c) A QAM signal is generated by two PAM signals, one for the real part and the other for the imaginary part.

(d) To transmit an even number of bits, say 2m bits, preferably 2m−2 bits of the total 2m bits are parallel bits that will bypass the turbo encoder. The remaining preferably 2 bits will pass through the turbo encoder. Two parity bits are generated after puncturing. The overall bandwidth efficiency is 2m bits/Hz using QAM.

(e) To transmit an odd number of bits, say 2m+1 bits, preferably 2m−2 bits of the total 2m+1 bits are parallel bits that will bypass the turbo encoder. The remaining preferably 3 bits will pass through the turbo encoder. One parity bit is generated after puncturing. The overall bandwidth efficiency is 2m+1 bits/Hz using QAM.

(f) Mode control may be employed in which a first mode may be used for transmitting an even number of bits and a second mode may be used for transmitting an odd number of bits.

(g) Alternate turbo codes such as serial concatenated turbo codes or multiple turbo codes may be used. Rather than using a turbo encoder, turbo product codes or LDPC codes may be used.

(h) Although the number of coded bits to be mapped to PAM is preferably two, this number may be greater than two.

The corresponding coding system has stored therein data representing sequences of instructions which when executed cause the above-described method to be performed. The coding system generally includes parallel-to-serial transfer means, interleaver means, encoder means, puncturing means, mapper means, and mode control means, which are generally implemented by a processor or other electronic circuitry.

Bit-Level Turbo Encoder Protecting A Few LSB Bits. For ADSL communication systems, there is a choice between using symbol-level turbo TCM or bit-level turbo TCM. However, in terms of decoding complexity, bit-level turbo TCM is superior for the following reasons. Firstly, symbol-level turbo TCM uses two-dimensional, four dimensional, or eight-dimensional set partitioning mapping at the encoder end. For very large constellations, this kind of set partitioning mapping typically requires a very complicated receiver de-mapper. Secondly, a symbol MAP decoder is typically more complicated than a bit MAP decoder. Thirdly, the complexity of a bit-level turbo coded QAM scheme may be reduced by protecting only a few least significant information bits. In fact, the decoder's length and complexity are proportional to the number of information bits. For example, consider $2^{14}$QAM. If only four least significant bits are protected and a coding rate ½ convolutional encoder is used as a component encoder, then the computational complexity of the decoder will be approximately six times lower than the computational complexity of a scheme where all bits are protected.

Referring to FIG. 1, there is shown a block diagram of a turbo coding system 100 in accordance with one embodiment of the invention. The turbo coding system 100 is suitable for application in ADSL communication systems. The turbo coding system 100 processes information bits 110 consisting of parallel bits 120 and encoding bits 130, and includes turbo encoder means 140, puncturing means 150 which generates coded bits 160, and Gray mapping and QAM modulation means 170. These means may be implemented by a processor or other electronic circuitry. The turbo coding system 100 may include a memory or other storage structure having stored therein data representing sequences of instructions which when executed cause the method described herein to be performed (for example, microcode or a computer program). Of course, the turbo coding system 100 may contain additional software and hardware a description of which is not necessary for understanding the invention.

A portion of the information bits 110, referred to as the parallel bits 120, are mapped by the QAM modulator 170 to the signal constellation point directly without any coding. The remaining portion of the information bits 110, referred to as encoding bits 130, are coded by the turbo encoder 140. The parallel bits 120 and coded bits 160 are mapped into one QAM signal by the QAM modulator 170. In order to achieve both low computation complexity for the de-mapper and good performance, a method in which two independent one-dimensional mappings with concatenated Gray mapping is used. This method will be described below.

Two Independent One-Dimensional Mappings. In typical prior art bit-level turbo coded QAM schemes, all the transmitted bits are protected by a turbo encoder. These transmitted bits may be either systematic bits or parity bits. The de-mapper in typical prior art schemes has to calculate soft information for all the transmitted bits. In the method and system of the present invention, the transmitted bits to be mapped to a QAM symbol are of three categories: parallel bits (i.e., that are not protected by the turbo code), systematic bits, and parity bits. In the method and system of the present invention, the receiver de-mapper only needs to calculate the soft information for the systematic and parity bits. For example, in the case of turbo TCM, for $2^{14}$ (16384) QAM, with the present invention only 4 soft bits need be calculated rather than 14 soft bits.

The de-mapper calculates the soft information bits from the received constellation signal for the turbo decoder by calculating $$\lambda_{k,j} = \log \frac{\sum_{S_m \in S^+} p(S_m / r_k)}{\sum_{S_n \in S^-} p(S_n / r_k)} \quad (1)$$

where $\lambda_{k,j}$ is the jth soft bit in the kth QAM symbol, $S^+$ is the constellation signal set corresponding to the jth bit set to "1", $S^-$ is the constellation signal set corresponding to the jth bit set to "0", and $r_k$ is the received complex sample for the kth QAM symbol.

Now, let M represent the number of information bits. For a $2^M$ QAM constellation, the size of $S^+$ or $S^-$ is $2^{M-1}$ (i.e., assuming a two dimensional set-partitioning mapping) and thus can be very large for a large M. As a result, the soft bit calculation in Equation (1) becomes computationally intense. However, if one-dimensional mapping is used, the size of $S^+$ or $S^-$ becomes $2^{M/2-1}$. This results in a complexity saving factor of $2^{M/2}$, as show TABLE 1 below. For large constellations, this complexity saving can be very significant. Note that the number of addition and multiplication operations for the soft bit calculation is proportional to the size of $S^+$ or $S^-$ which is approximately as large as a multiple of 16384 for a 16384QAM signal.

TABLE 1

Complexity Comparison of 1D and 2D Mapping

| M | 2D mapping | 1D mapping | Saving factor |
|---|---|---|---|
| 8 | 128 | 8 | 16 |
| 10 | 512 | 16 | 32 |
| 12 | 2048 | 32 | 64 |
| 14 | 8192 | 64 | 128 |

Concatenated Gray Mapping. In order to achieve good performance, the present invention employs a mapping scheme which will be referred to as "concatenated Gray mapping". In concatenated Gray mapping, two Gray mappings (e.g., inner and outer Gray mappings) are concatenated serially. The inner mapping is for the turbo coded bits that include both systematic bits and parity bits, and the outer mapping is for the uncoded parallel bits.

Figure 2:
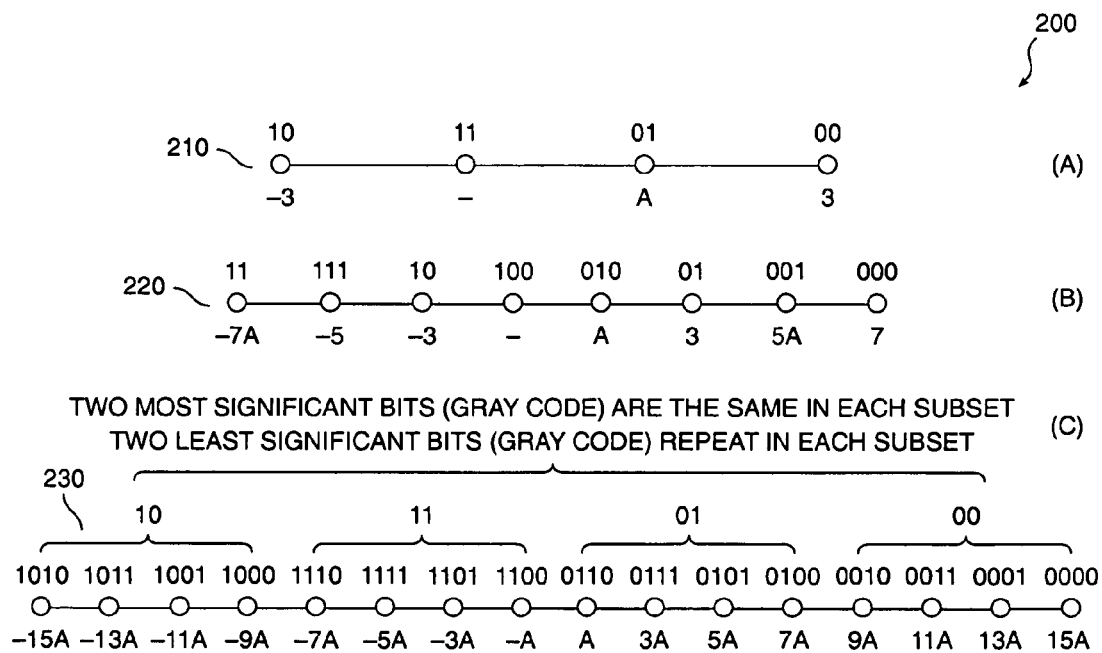
FIG. 2 shows three line diagrams illustrating concatenated Gray mappings for 4-ASK, 8-ASK, and 16-ASK, respectively, in accordance with a preferred embodiment of the invention.

Referring to FIG. 2, there are shown three line diagrams 200 of three examples of this mapping technique, namely, for 4-ASK 210 (Gray mapping), 8-ASK 220 (set partition mapping plus Gray mapping), and 16-ASK 230 (concatenated Gray mapping). In these examples, the two least significant bits are coded bits and are used for inner Gray mapping, and the remaining bits are used for outer Gray mapping. Since the two least significant bits are either systematic bits or parity bits, the Gray mapping can provide equal protection for them. Furthermore, the minimum Euclidean distance for the uncoded parallel bits is also maximized by the outer Gray mapping. Therefore, this technique ensures good error protection for the encoded bits and the uncoded parallel bits. A detailed example of this mapping technique is provided below.

Figure 3:
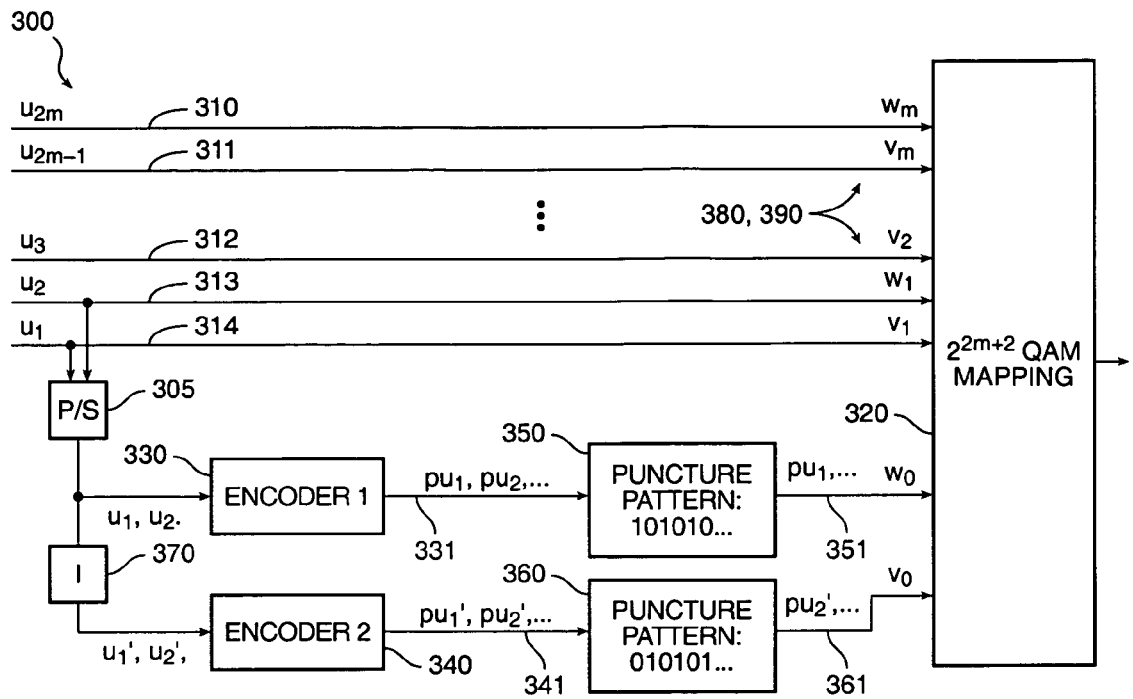
FIG. 3 is a block diagram of a turbo coding system with coding rate 2m/(2m+2), where m>0, in accordance with one embodiment of the invention.

Turbo Coded QAM System with Coding Rate R=2m/(2m+2). Referring to FIG. 3, there is shown a block diagram of a turbo coding system 300 with coding rate 2m/(2m+2), where m>0, in accordance with another embodiment of the invention. Here, the turbo coded QAM system with coding rate R=2m/(2m+2) is used to transmit an even number of information bits in one QAM symbol. In this embodiment, 2m information bits u 310, 311, 312, 313, 314 are transmitted in each $2^{2m+2}$QAM signal produced by the QAM mapper 320. Two identical recursive systematic convolutional ("RSC") encoders 330, 340 with coding rate ½ are employed. Parallel-to-serial converter 305 and interleaver 370 are employed. The outputs of the two encoders 330, 340 are four parity bits 331, 341 for two information bits ($u_1$, $u_2$) 313, 314 and are punctured alternatively (i.e., with different puncturing phase) by puncturing units 350, 360. For every two information bits ($u_1$, $u_2$) 313, 314, two parity bits are left after puncturing. One parity bit $pu_1$ 351 is the parity bit for $u_1$ 314, and the other parity bit $pu_2'$ 361 is the parity bit for the version of $u_2$ 313 interleaved by the interleaver 370. Now, in order to have equal protection for all information bits, it would be desirable that each information bit have one parity bit. This requires that the interleaver 370 permutates the bits at even number positions to even number positions and that it permutates the bits at odd number positions to odd number positions. The two vectors ($v_0, v_1, \ldots, v_m$) 380 and ($w_0, w_1, \ldots, w_m$) 390 will be mapped by the QAM mapper 320 into two $2^{m+1}$-ASK signals independently. For low data rates, if the uncoded bits are absent, ($v_0, v_1$) 380 or ($w_0, w_1$) 390 may be mapped into one 4QAM signal or two BPSK signals.

In addition, this embodiment employs "concatenated Gray mapping". The vector ($v_0, v_1, \ldots, v_m$) 380 consists of coded bits ($v_0, v_1$)=($pu_2', u_1$) and uncoded bits ($v_2, v_3, \ldots, v_m$). As discussed above in reference to FIG. 2, the coded bits ($v_0, v_1$) may form an inner Gray mapping and the uncoded bits ($v_2, v_3, \ldots, v_m$) may form an outer Gray mapping. These two mappings are then concatenated.

TABLE 2 through TABLE 7 below illustrate the relationship between QAM size, parallel bits and encoded bits, and puncturing pattern and puncturing rate. In these tables, the subscript of the symbol "d" represents the index of QAM symbols in the time domain. The turbo coded QAM system of this embodiment may be used for at least the following:

1. Coding rate 2/4 16QAM with bandwidth efficiency of 2 bits/Hz;
2. Coding rate 4/6 64QAM with bandwidth efficiency of 4 bits/Hz;
3. Coding rate 6/8 256QAM with bandwidth efficiency of 6 bits/Hz;
4. Coding rate 8/10 1024QAM with bandwidth efficiency of 8 bits/Hz;
5. Coding rate 10/12 4096QAM with bandwidth efficiency of 10 bits/Hz;
6. Coding rate 12/14 16384QAM with bandwidth efficiency of 12 bits/Hz; and
7. Coding rate ½ 4QAM with bandwidth efficiency of 1 bits/Hz.

TABLE 2

Puncturing and Mapping for 16QAM with Rate 2/4
(transmitting 2 bits)

| | | |
|---|---|---|
| Information data $d_k$ | | $d_1^1, d_2^1$ |
| Encoder input data | $d_1^1$ | $d_2^1$ |
| Parity bit from encoder 1 | $p_1^1$ | — |
| Parity bit from encoder 2 | — | $p_2^1$ |

TABLE 2-continued

Puncturing and Mapping for 16QAM with Rate 2/4
(transmitting 2 bits)

| | |
|---|---|
| 4ASK symbol (I) | ($d_1^1, p_1^1$) |
| 4ASK symbol (Q) | ($d_2^1, p_2^1$) |
| 16QAM | ($d_1^1, p_1^1, d_2^1, p_2^1$) |

TABLE 3

Puncturing and Mapping for 64QAM with Rate 4/6
(transmitting 4 bits)

| | | |
|---|---|---|
| Information data $d_k$ | | $d_1^1, d_2^1, d_3^1, d_4^{1*}$ |
| Encoder input data | $d_1^1$ | $d_2^1$ |
| Parity bit from encoder 1 | $p_1^1$ | — |
| Parity bit from encoder 2 | — | $p_2^1$ |
| 8ASK symbol (I) | | ($d_3^1, d_1^1, p_1^1$) |
| 8ASK symbol (Q) | | ($d_4^1, d_2^1, p_2^1$) |
| 64QAM | | ($d_3^1, d_1^1, p_1^1, d_4^1, d_2^1, p_2^1$) |

*NOTE:
$d_3^1, d_4^1$ do not go through the convolutional encoder in order to reduce the decoder complexity

TABLE 4

Puncturing and Mapping for 256QAM with Rate 6/8
(transmitting 6 bits)

| | | |
|---|---|---|
| Information data $d_k$ | | $d_1^1, d_2^1, d_3^1, d_4^1, d_5^1, d_6^{1*}$ |
| Encoder input data | $d_1^1$ | $d_2^1$ |
| Parity bit from encoder 1 | $p_1^1$ | — |
| Parity bit from encoder 2 | — | $p_2^1$ |
| 16ASK symbol (I) | | ($d_5^1, d_3^1, d_1^1, p_1^1$) |
| 16ASK symbol (Q) | | ($d_6^1, d_4^1, d_2^1, p_2^1$) |
| 256QAM | | ($d_5^1, d_3^1, d_1^1, p_1^1, d_6^1, d_4^1, d_2^1, p_2^1$) |

*NOTE:
$d_3^1, d_4^1, d_5^1, d_6^1$ do not go through the convolutional encoder in order to reduce the decoder complexity

TABLE 5

Puncturing and Mapping for 1024QAM with Rate 8/10
(transmitting 8 bits)

| | | |
|---|---|---|
| Information data $d_k$ | | $d_1^1, d_2^1, d_3^1, d_4^1, d_5^1, d_6^1, d_7^1, d_8^{1*}$ |
| Encoder input data | $d_1^1$ | $d_2^1$ |
| Parity bit from encoder 1 | $p_1^1$ | — |
| Parity bit from encoder 2 | — | $p_2^1$ |
| 32ASK symbol (I) | | ($d_7^1, d_5^1, d_3^1, d_1^1, p_1^1$) |
| 32ASK symbol (Q) | | ($d_8^1, d_6^1, d_4^1, d_2^1, p_2^1$) |
| 1024QAM | | ($d_7^1, d_5^1, d_3^1, d_1^1, p_1^1, d_8^1, d_6^1, d_4^1, d_2^1, p_2^1$) |

*NOTE:
$d_3^1, d_4^1, \ldots, d_7^1, d_8^1$ do not go through the convolutional encoder in order to reduce the decoder complexity

TABLE 6

Puncturing and Mapping for 4096QAM with Rate 10/12
(transmitting 10 bits)

| | | |
|---|---|---|
| Information data $d_k$ | | $d_1^1, d_2^1, d_3^1, d_4^1, d_5^1, d_6^1, d_7^1, d_8^1, d_9^1, d_{10}^{1*}$ |
| Encoder input data | $d_1^1$ | $d_2^1$ |
| Parity bit from encoder 1 | $p_1^1$ | — |
| Parity bit from encoder 2 | — | $p_2^1$ |
| 64ASK symbol (I) | | ($d_9^1, d_7^1, d_5^1, d_3^1, d_1^1, p_1^1$) |

TABLE 6-continued

Puncturing and Mapping for 4096QAM with Rate 10/12
(transmitting 10 bits)

| | |
|---|---|
| 64ASK symbol (Q) | $(d_{10}^1, d_8^1, d_6^1, d_4^1, d_2^1, p_2^1)$ |
| 4096QAM | $(d_9^1, d_7^1, d_5^1, d_3^1, d_1^1,$ $p_1^1, d_{10}^1, d_8^1, d_6^1, d_4^1,$ $d_2^1, p_2^1)$ |

*NOTE:
$d_3^1, d_4^1, \ldots, d_9^1, d_{10}^1$ do not go through the convolutional encoder in order to reduce the decoder complexity

TABLE 7

Puncturing and Mapping for 16384QAM with Rate 12/14
(transmitting 12 bits)

| | |
|---|---|
| Information data $d_k$ | $d_1^1, d_2^1, d_3^1, d_4^1,$ $d_5^1, d_6^1, d_7^1, d_8^1,$ $d_9^1, d_{10}^1, d_{11}^1, d_{12}^{1*}$ |
| Encoder input data | $d_1^1 \quad d_2^1$ |
| Parity bit from encoder 1 | $p_1^1 \quad —$ |
| Parity bit from encoder 2 | $— \quad p_2^1$ |
| 128ASK symbol (I) | $(d_{11}^1, d_9^1, d_7^1, d_5^1,$ $d_3^1, d_1^1, p_1^1)$ |
| 128ASK symbol (Q) | $(d_{12}^1, d_{10}^1, d_8^1, d_6^1, d_4^1,$ $d_2^1, p_2^1)$ |
| 16384QAM | $(d_{11}^1, d_9^1, d_7^1, d_5^1, d_3^1, d_1^1,$ $p_1^1, d_{12}^1, d_{10}^1, d_8^1, d_6^1, d_4^1,$ $d_2^1, p_2^1)$ |

Figure 4:
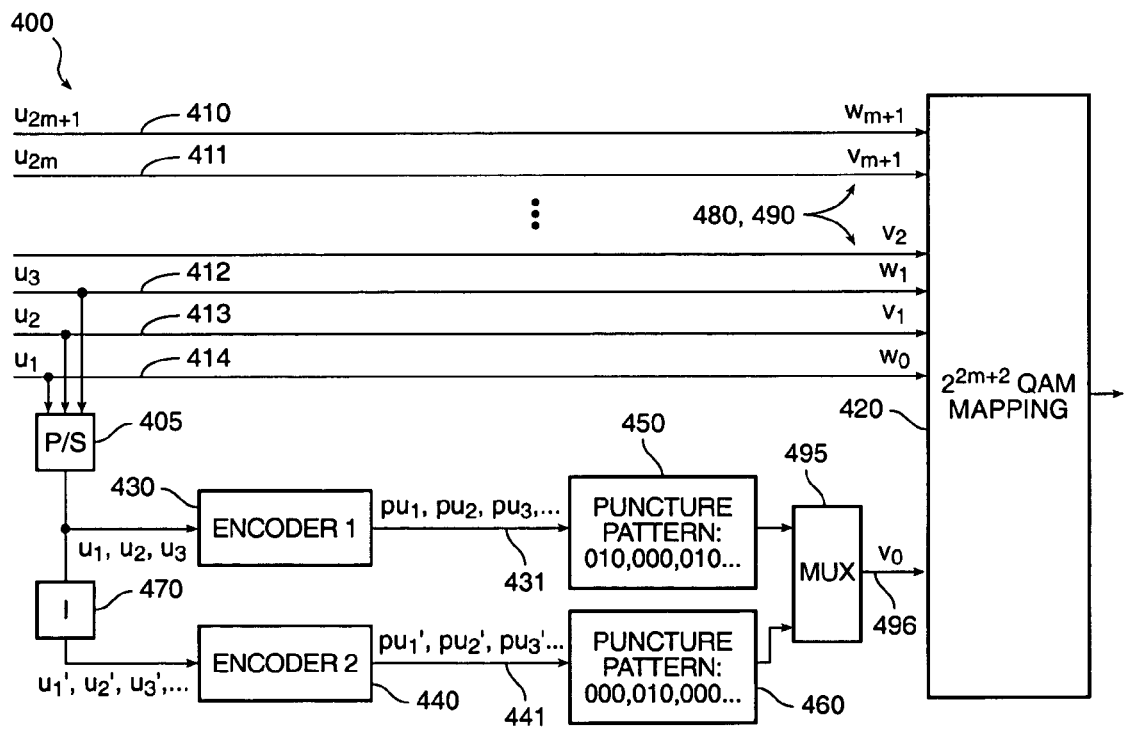
FIG. 4 is a block diagram of a turbo coding system with coding rate (2m+1)/(2m+2), where m>0, in accordance with another embodiment of the invention.

*NOTE:
$d_3^1, d_4^1, \ldots, d_{11}^1, d_{12}^1$ do not go through the convolutional encoder in order to reduce the decoder complexity Turbo Encoder with Coding Rate $R=(2m+1)/(2m+2)$ for MQAM (M 16). Referring to FIG. 4, there is shown a block diagram of a turbo coding system 400 with coding rate $(2m+1)/(2m+2)$, where m>0, in accordance with another embodiment of the invention. Here, the turbo coded QAM system with coding rate $R=(2m+1)/(2m+2)$ is used to transmit an odd number of information bits in one QAM symbol. In this embodiment, 2m+1 information bits 410, 411, 412, 413, 414 are transmitted in each $2^{2m+2}$QAM signal generated by the QAM mapper 420. For every three information bits 412, 413, 414 passed into the two RSC encoders 430, 440, six parity bits 431, 441 are generated. Parallel-to-serial converter 405 and interleaver 470 are again employed. The parity bits generated by each RSC encoder are punctured by the puncturing units 450, 460 with the puncturing rate 5/6 (i.e., 5 of 6 parity bits are punctured). The two puncturing phases (or patterns) used by the puncturing units 450, 460 are offset three bits from each other. The unpunctured bits remaining after the two puncturing units 450, 460 are multiplexed by the multiplexer 495 to obtain the remaining parity bits. For each group of three information bits ($u_1, u_2, u_3$) 412, 413, 414, one parity bit $v_0$ 496 is generated. The parallel bits and coded bits are mapped by the QAM mapper 420 into a one-dimensional ASK signal using concatenated Gray mapping as described above and as illustrated in FIG. 2.

TABLE 8 through TABLE 13 below illustrate the relationship between QAM size, parallel bits and encoded bits, and puncturing pattern and puncturing rate. In these tables, the subscript of the symbol "d" represents the index of QAM symbols in the time domain. The turbo coded QAM system of this embodiment may be used for at least the following:

1. Coding rate 3/4 16QAM with bandwidth efficiency of 3 bits/Hz;

2. Coding rate 5/6 64QAM with bandwidth efficiency of 5 bits/Hz;

3. Coding rate 7/8 256QAM with bandwidth efficiency of 7 bits/Hz;

4. Coding rate 9/10 1024QAM with bandwidth efficiency of 9 bits/Hz;

5. Coding rate 11/12 4096QAM with bandwidth efficiency of 11 bits/Hz; and

6. Coding rate 13/14 16384QAM with bandwidth efficiency of 13 bits/Hz.

TABLE 8

Puncturing and Mapping for 16QAM with Rate 3/4
(transmitting 3 bits)

| | | | | | | |
|---|---|---|---|---|---|---|
| Information data $d_k$ | | $d_1^1, d_2^1, d_3^1, d_1^2, d_2^2, d_3^2$ | | | | |
| Encoder input data | $d_1^1$ | $d_2^1$ | $d_3^1$ | $d_1^2$ | $d_2^2$ | $d_3^2$ |
| Parity bit from encoder 1 | — | $p_2^1$ | — | — | — | — |
| Parity bit from encoder 2 | — | — | — | — | $p_2^2$ | — |
| 4ASK symbol (I) | $(d_3^1, d_1^1)$ | | | $(d_3^2, d_1^2)$ | | |
| 4ASK symbol (Q) | $(d_2^1, p_2^1)$ | | | $(d_2^2, p_2^2)$ | | |
| 16QAM | $(d_3^1, d_1^1, d_2^1, p_2^1)$ | | | $(d_3^2, d_1^2, d_2^2, p_2^2)$ | | |

TABLE 9

Puncturing and Mapping for 64QAM with Rate 5/6
(transmitting 5 bits)

| | | | | | | |
|---|---|---|---|---|---|---|
| Information data $d_k$ | $d_1^1, d_2^1, d_3^1, d_4^1, d_5^1, d_1^2, d_2^2, d_3^2, d_4^2, d_5^{2*}$ | | | | | |
| Encoder input data | $d_1^1$ | $d_2^1$ | $d_3^1$ | $d_1^2$ | $d_2^2$ | $d_3^2$ |
| Parity bit from encoder 1 | — | $p_2^1$ | — | — | — | — |
| Parity bit from encoder 2 | — | — | — | — | $p_2^2$ | — |
| 8ASK symbol (I) | $(d_5^1, d_3^1, d_1^1)$ | | | $(d_5^2, d_3^2, d_1^2)$ | | |
| 8ASK symbol (Q) | $(d_4^1, d_2^1, p_2^1)$ | | | $(d_4^2, d_2^2, p_2^2)$ | | |
| 64QAM | $(d_5^1, d_3^1, d_1^1,$ $d_4^1, d_2^1, p_2^1)$ | | | $(d_5^2, d_3^2, d_1^2,$ $d_4^2, d_2^2, p_2^2)$ | | |

*NOTE:
$d_4^1, d_5^1, \ldots, d_4^2, d_5^2$ do not go through the convolutional encoder in order to reduce the decoder complexity

TABLE 10

Puncturing and Mapping for 256QAM with Rate 7/8
(transmitting 7 bits)

| | | | | | | |
|---|---|---|---|---|---|---|
| Information data $d_k$ | $d_1^1, d_2^1, d_3^1, d_4^1, d_5^1, d_6^1, d_7^1,$ $d_1^2, d_2^2, d_3^2, d_4^2, d_5^2, d_6^2, d_7^{2*}$ | | | | | |
| Encoder input data | $d_1^1$ | $d_2^1$ | $d_3^1$ | $d_1^2$ | $d_2^2$ | $d_3^2$ |
| Parity bit from encoder 1 | — | $p_2^1$ | — | — | — | — |
| Parity bit from encoder 2 | — | — | — | — | $p_2^2$ | — |
| 16ASK symbol (I) | $(d_7^1, d_5^1, d_3^1, d_1^1)$ | | | $(d_7^2, d_5^2, d_3^2, d_1^2)$ | | |
| 16ASK symbol (Q) | $(d_6^1, d_4^1, d_2^1, p_2^1)$ | | | $(d_6^2, d_4^2, d_2^2, p_2^2)$ | | |
| 256QAM | $(d_7^1, d_5^1, d_3^1, d_1^1, d_6^1,$ $d_4^1, d_2^1, p_2^1)$ | | | $(d_7^2, d_5^2, d_3^2, d_1^2, d_6^2,$ $d_4^2, d_2^2, p_2^2)$ | | |

*NOTE:
$d_3^1, \ldots, d_7^1$ and $d_3^2, \ldots, d_7^2$ do not go through the convolutional encoder in order to reduce the decoder complexity

TABLE 11

Puncturing and Mapping for 1024QAM with Rate 9/10
(transmitting 9 bits)

| | | | | | | |
|---|---|---|---|---|---|---|
| Information data $d_k$ | $d_1^1, d_2^1, d_3^1, d_4^1, d_5^1, d_6^1, d_7^1, d_8^1, d_9^1,$ $d_1^2, d_2^2, d_3^2, d_4^2, d_5^2, d_6^2, d_7^2, d_8^2, d_9^{2*}$ | | | | | |
| Encoder input data | $d_1^1$ | $d_2^1$ | $d_3^1$ | $d_1^2$ | $d_2^2$ | $d_3^2$ |
| Parity bit from encoder 1 | — | $p_2^1$ | — | — | — | — |
| Parity bit from encoder 2 | — | — | — | — | $p_2^2$ | — |
| 32ASK symbol (I) | $(d_9^1, d_7^1, d_5^1, d_3^1, d_1^1)$ | | | $(d_9^2, d_7^2, d_5^2, d_3^2, d_1^2)$ | | |
| 32ASK symbol (Q) | $(d_8^1, d_6^1, d_4^1, d_2^1, p_2^1)$ | | | $(d_8^2, d_6^2, d_4^2, d_2^2, p_2^2)$ | | |
| 1024QAM | $(d_9^1, d_7^1, d_5^1, d_3^1, d_1^1,$ $d_8^1, d_6^1, d_4^1, d_2^1, p_2^1)$ | | | $(d_9^2, d_7^2, d_5^2, d_3^2, d_1^2,$ $d_8^2, d_6^2, d_4^2, d_2^2, p_2^2)$ | | |

*NOTE:
$d_3^1, \ldots, d_9^1$ and $d_3^2, \ldots, d_9^2$ do not go through the convolutional encoder in order to reduce the decoder complexity

TABLE 12

Puncturing and Mapping for 4096QAM with Rate 11/12
(transmitting 11 bits)

| Information data $d_k$ | $d_1^1, d_2^1, d_3^1, d_4^1, d_5^1, d_6^1, d_7^1, d_8^1, d_9^1, d_{10}^1, d_{11}^1, d_1^2, d_2^2,$ $d_3^2, d_4^2, d_5^2, d_6^2, d_7^2, d_8^2, d_9^2, d_{10}^2, d_{11}^{2*}$ | | | | | |
|---|---|---|---|---|---|---|
| Encoder input data | $d_1^1$ | $d_2^1$ | $d_3^1$ | $d_1^2$ | $d_2^2$ | $d_3^2$ |
| Parity bit from encoder 1 | — | $p_2^1$ | — | — | — | — |
| Parity bit from encoder 2 | — | — | — | — | $p_2^2$ | — |
| 64ASK symbol (I) | $(d_{11}^1, d_9^1, d_7^1, d_5^1, d_3^1, d_1^1)$ | | | $(d_{11}^2, d_9^2, d_7^2, d_5^2, d_3^2, d_1^2)$ | | |
| 64ASK symbol (Q) | $(d_{10}^1, d_8^1, d_6^1, d_4^1, d_2^1, p_2^1)$ | | | $(d_{10}^2, d_8^2, d_6^2, d_4^2, d_2^2, p_2^2)$ | | |
| 4096QAM | $(d_{11}^1, d_9^1, d_7^1, d_5^1, d_3^1, d_1^1,$ $d_{10}^1, d_8^1, d_6^1, d_4^1, d_2^1, p_2^1)$ | | | $(d_{11}^2, d_9^2, d_7^2, d_5^2, d_3^2, d_1^2,$ $d_{10}^2, d_8^2, d_6^2, d_4^2, d_2^2, p_2^2)$ | | |

*NOTE:
$d_3^1, \ldots, d_{11}^1$ and $d_3^2, \ldots, d_{11}^2$ do not go through the convolutional encoder in order to reduce the decoder complexity

TABLE 13

Puncturing and Mapping for 16384QAM with Rate 13/14
(transmitting 13 bits)

| Information data $d_k$ | $d_1^1, d_2^1, d_3^1, d_4^1, d_5^1, d_6^1, d_7^1, d_8^1, d_9^1, d_{10}^1, d_{11}^1, d_{12}^1, d_{13}^1, d_1^2 d_2^2,$ $d_3^2, d_4^2, d_5^2, d_6^2, d_7^2, d_8^2, d_9^2, d_{10}^2, d_{11}^2, d_{12}^2, d_{13}^{2*}$ | | | | | |
|---|---|---|---|---|---|---|
| Encoder input data | $d_1^1$ | $d_2^1$ | $d_3^1$ | $d_1^2$ | $d_2^2$ | $d_3^2$ |
| Parity bit from encoder 1 | — | $p_2^1$ | — | — | — | — |
| Parity bit from encoder 2 | — | — | — | — | $p_2^2$ | — |
| 128ASK symbol (I) | $(d_{13}^1, d_{11}^1, d_9^1, d_7^1, d_5^1, d_3^1, d_1^1)$ | | | $(d_{13}^2, d_{11}^2, d_9^2, d_7^2, d_5^2, d_3^2, d_1^2)$ | | |
| 128ASK symbol (Q) | $(d_{12}^1, d_{10}^1, d_8^1, d_6^1, d_4^1, d_2^1, p_2^1)$ | | | $(d_{12}^2, d_{10}^2, d_8^2, d_6^2, d_4^2, d_2^2, p_2^2)$ | | |
| 16384QAM | $(d_{13}^1, d_{11}^1, d_9^1, d_7^1, d_5^1, d_3^1, d_1^1,$ $d_{12}^1, d_{10}^1, d_8^1, d_6^1, d_4^1, d_2^1, p_2^1)$ | | | $(d_{13}^2, d_{11}^2, d_9^2, d_7^2, d_5^2, d_3^2, d_1^2,$ $d_{12}^2, d_{10}^2, d_8^2, d_6^2, d_4^2, d_2^2, p_2^2)$ | | |

Figure 5:
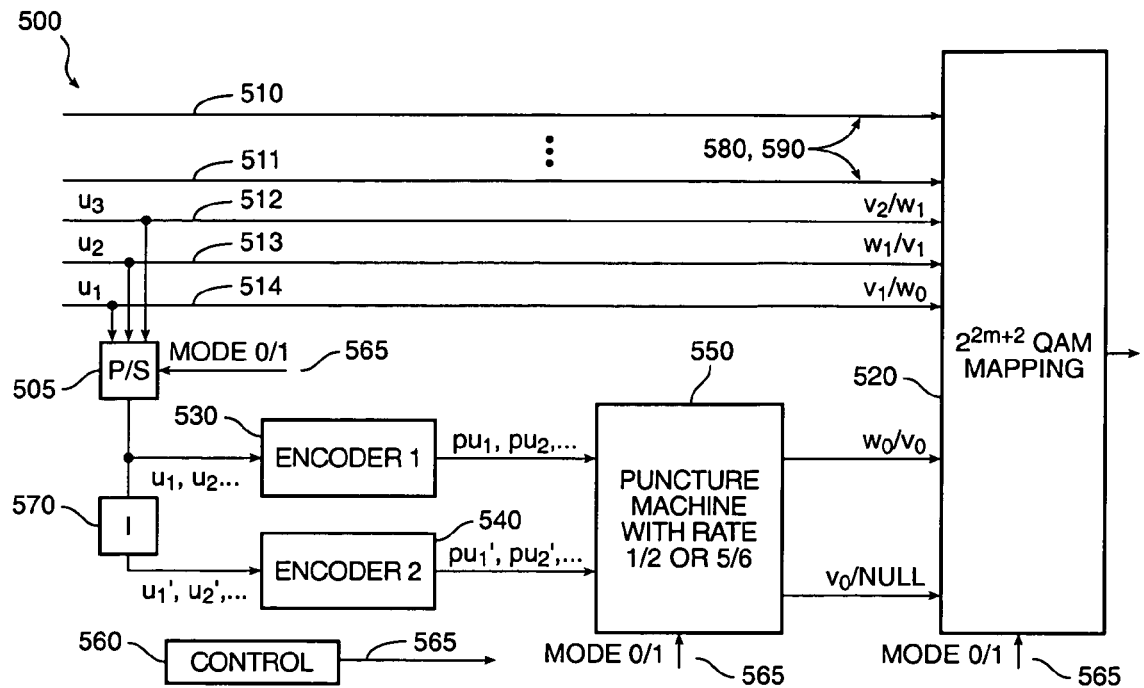
FIG. 5 is a block diagram of a universal turbo coding system using mode control with coding rates 2m/(2m+2) and (2m+1)/(2m+2), where m>0, in accordance with the invention.

*NOTE:
$d_3^1, \ldots, d_{13}^1$ and $d_3^2, \ldots, d_{13}^2$ do not go through the convolutional encoder in order to reduce the decoder complexity Universal Implementation of Turbo Coded QAM for MQAM. Referring to FIG. 5, there is shown a block diagram of a universal turbo coding system 500 using mode control with coding rates 2m/(2m+2) and (2m+1)/(2m+2), where m>0, in accordance with another embodiment of the invention. Here, a universal implementation system applicable to the embodiments illustrated in FIG. 3 and FIG. 4 for coding rates R=2m/(2m+2) and R=(2m+1)/(2m+2) is described. The puncture rate for each RSC encoder 530, 540 is either P=½ for coding rate R=2m/(2m+2) or P=⅚ for coding rate R=(2m+1)/(2m+2). This puncture rate is controlled by a mode control signal 565 having states corresponding to even and odd numbers of information bits 510, 511, 512, 513, 514. The mode control signal may be generated by a control unit 560. The parity bits from the two conventional encoders 530, 540 are evenly and alternatively punctured by the puncturing unit 550. The parallel-to-serial transfer means ("P/S") 505 is also controlled by the mode control signal 565, which will control whether $u_3$ 512 is used or not by the P/S transfer unit 505 and the encoders 530, 540. An interleaver 570 is again employed. The constellation mapper 520 is also controlled by the mode control signal 565, which will indicate the position of the least significant bit. Finally, the bits passed into the RSC encoders 530, 540 and their parity bits are grouped into two 2-bit vectors ($v_0, v_1$) and ($w_0, w_1$) 580, 590. Then, ($v_0, v_1, \ldots, v_m$) and ($w_0, w_1, \ldots, w_m$) 580, 590 are mapped by the QAM mapper 520 into an ASK signal format, if a large constellation MQAM (i.e., M16) is used, or they are mapped into one 4QAM signal or two BPSK signals, if 4QAM or BPSK is employed.

General Coded QAM Using Any Turbo Codes. The embodiments discussed above in reference to the turbo coded QAM systems of FIG. 3, FIG. 4, and FIG. 5 used double parallel concatenated convolutional encoders, with each encoder employing a coding rate ½ convolutional encoder. However, the invention may make use of different kinds of turbo codes (e.g., a parallel concatenated convolutional encoder with each encoder using a coding rate other than ½, a multiple parallel concatenated convolutional encoder [refer to D. Divsalar and F. Pollara, "Multiple Turbo Codes for Deep-Space Communications", JPL TDA Progress Report 42–121, May 15, 1995], serial concatenated turbo codes [refer to S. Benedetto, D. Divsalar, G. Montorsi and F. Pollara, "Serial Concatenation of Interleaved Codes: Performance Analysis, Design, and Iterative Decoding", JPL TDA Progress Report 42–126, Aug. 15, 1996], etc.). For many of the following figures, the numbered elements in the figures that are not described correspond generally to those elements with similar numbers and/or labels as discussed in detail above with reference to other figures.

Figure 6:
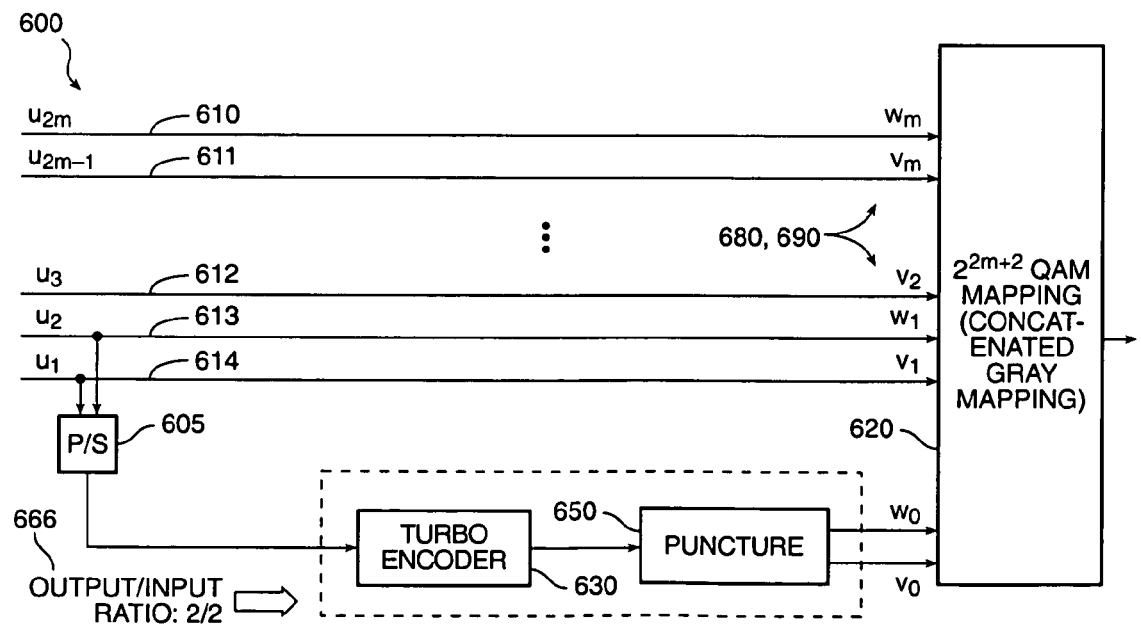
FIG. 6 is a block diagram of a general turbo coding system using an arbitrary turbo coding method with coding rate 2m/(2m+2), where m>0, in accordance with one embodiment of the invention.

Referring to FIG. 6, there is shown a block diagram of a general turbo coding system 600 using any turbo coding method with coding rate 2m/(2m+2), where m>0, in accordance with another embodiment of the invention. In this embodiment, any kind of turbo code may be used for an overall coding rate of 2m/(2m+2). For every QAM symbol produced by the QAM mapper 620, two parity bits are used, the number of input bits 613, 614 to the turbo encoder 630 is two, and the number of parity bits after puncturing by the puncturing unit 650 is two. This embodiment has an output/input ratio 666 of 2/2.

Figure 7:
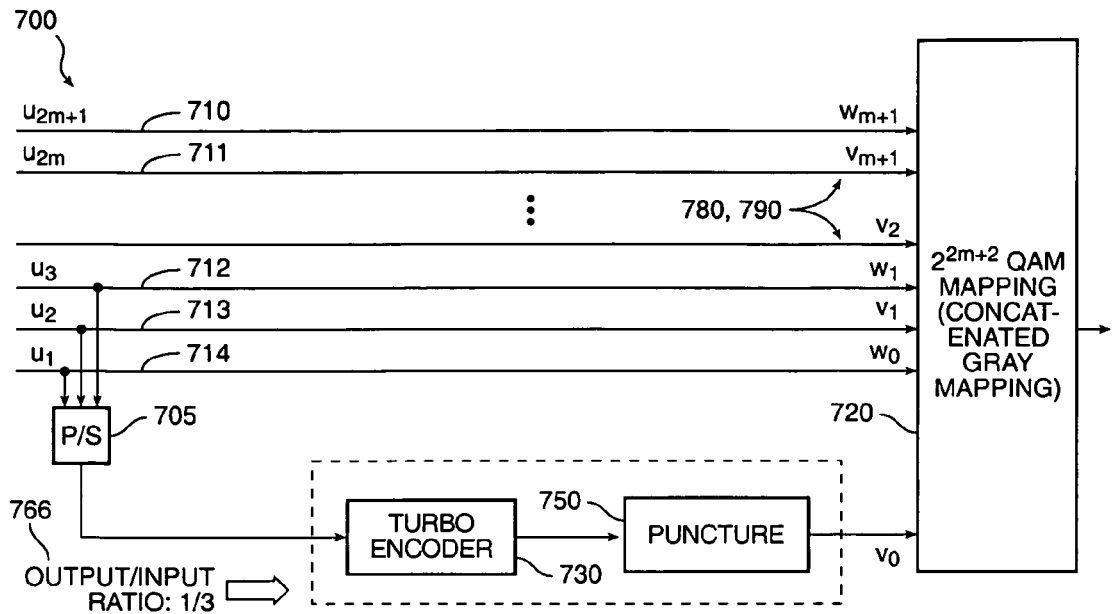
FIG. 7 is a block diagram of a general turbo coding system using any turbo coding method with coding rate (2m+1)/(2m+2), where m>0, in accordance with another embodiment of the invention.

Referring to FIG. 7, there is shown a block diagram of a general turbo coding system 700 using any turbo coding method with coding rate (2m+1)/(2m+2), where m>0, in accordance with another embodiment of the invention. In this embodiment, any kind of turbo code may be used for an overall coding rate of (2m+1)/(2m+2). For every QAM symbol produced by the QAM mapper 720, one parity bit is used, the number of input bits 712, 713, 714 to the turbo encoder 730 is three, and the number of parity bits after puncturing by the puncturing unit 750 is one. This embodiment has an output/input ratio 766 of 1/3.

Figure 8:
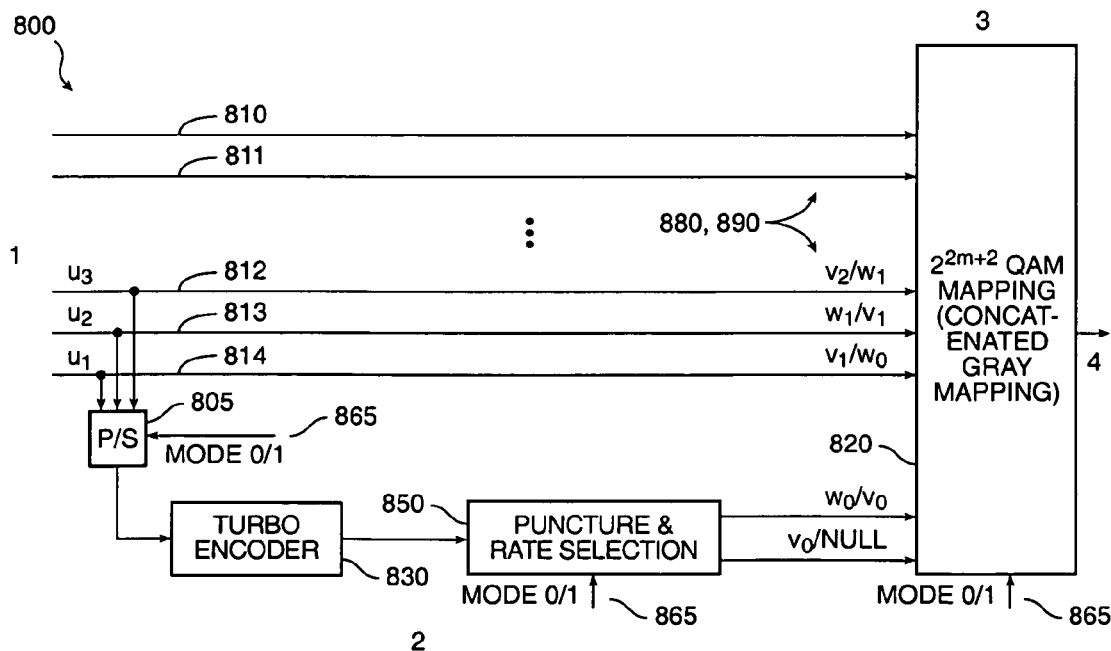
FIG. 8 is a block diagram of a universal turbo coding system similar to the embodiment of FIG. 5 using mode control and any turbo coding method with coding rates 2m/(2m+2) and (2m+1)/(2m+2), where m>0.

Referring to FIG. 8, there is shown a block diagram of a universal turbo coding system 800 using mode control and any turbo coding method with coding rates 2m/(2m+2) and (2m+1)/(2m+2), where m>0, in accordance with another embodiment. In this embodiment, any turbo code may be used for coding rates 2m/(2m+2) and (2m+1)/(2m+2). This embodiment employs mode control signal 865.

Coded QAM Using Turbo Product Codes and Low-Density Parity Check (LDPC) Codes. Other powerful coding schemes such as turbo product codes (refer to D. Chase, "A Class of Algorithms for Decoding Block Codes", IEEE Trans. Inform. Theory, Vol. IT-18, pp. 170–182, January 1972; and R. Pyndiah, "Near Optimum Decoding of Product Codes: Block Turbo Codes", IEEE Trans. Commun., Vol. COM-46, No. 8, pp. 1003–1010, August 1998) and low-density parity check (LDPC) codes (refer to R. G. Gallager, "Low-Density Parity Check Codes", IRE Trans. Inform. Theory, vol. IT-8, pp. 21–28, January 1962; D. J. C. Mackay and R. M. Neal, "Near Shannon Limit Performance of Low Density Parity Check Codes", Electron. Lett., vol. 32, No. 18, pp. 1645–1646, August 1996; and D. J. C. Mackay, "Good Error-Correcting Codes Based on Very Sparse Matrices", IEEE Tran. Inform. Theory, vol. 45, No. 2, pp. 399–431, March 1999) may also be used in the coded QAM system of the present invention.

Figure 9:
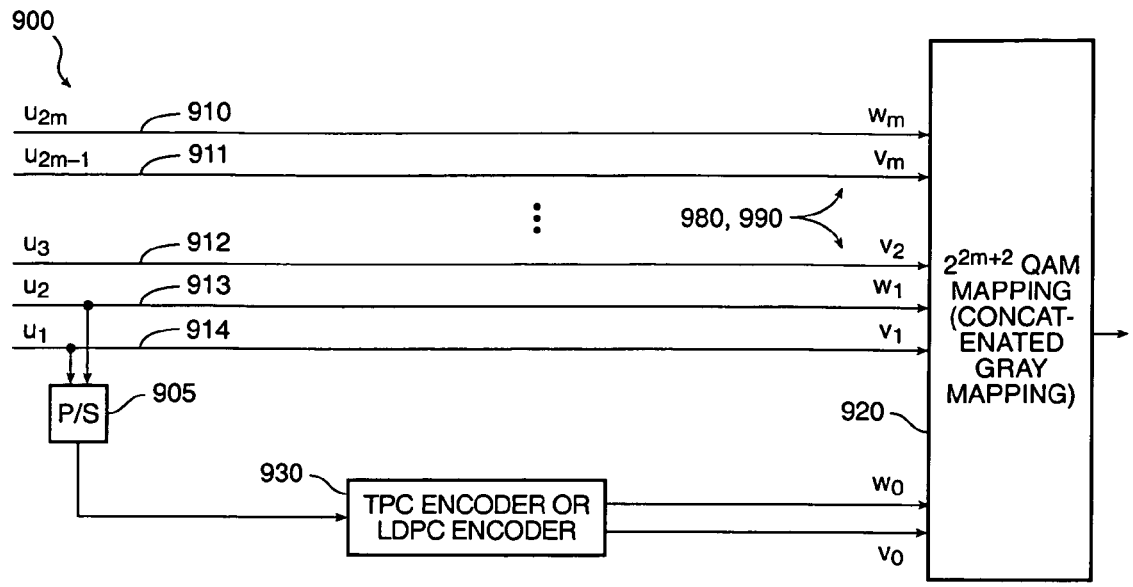
FIG. 9 is a block diagram of a turbo product or low-density parity check coding system with coding rate 2m/(2m+2), where m>0, in accordance with a preferred embodiment.

Referring to FIG. 9, there is shown a block diagram of a turbo product or low-density parity check ("LDPC") coding system 900 with coding rate 2m/(2m+2), where m>0, in accordance with another embodiment of the invention. In this embodiment, a turbo product code or LDPC encoder 930 for the coding rate (2m+1)/(2m+2) is employed.

Figure 10:
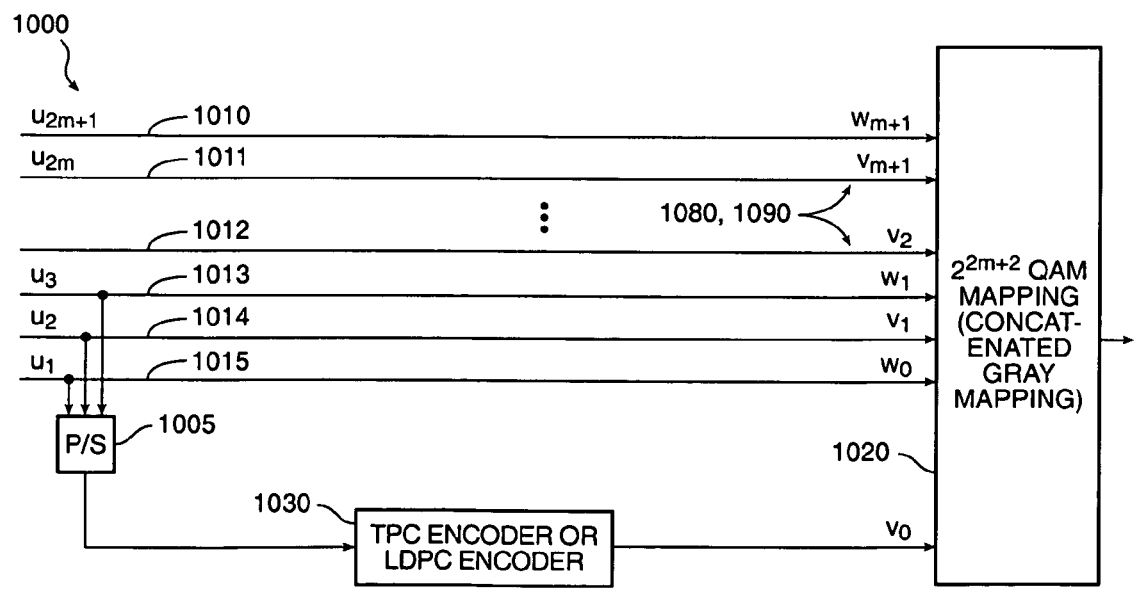
FIG. 10 is a block diagram of a turbo product or low-density parity check coding system with coding rate (2m+1)/(2m+2), where m>0, in accordance with a preferred embodiment.

Referring to FIG. 10, there is shown a block diagram of a turbo product or low-density parity check ("LDPC") coding system 1000 with coding rate (2m+1)/(2m+2), where m>0, in accordance with another embodiment of the invention. In this embodiment, a turbo product code or LDPC encoder 1030 for the coding rate (2m+1)/(2m+2) is employed.

Figure 11:
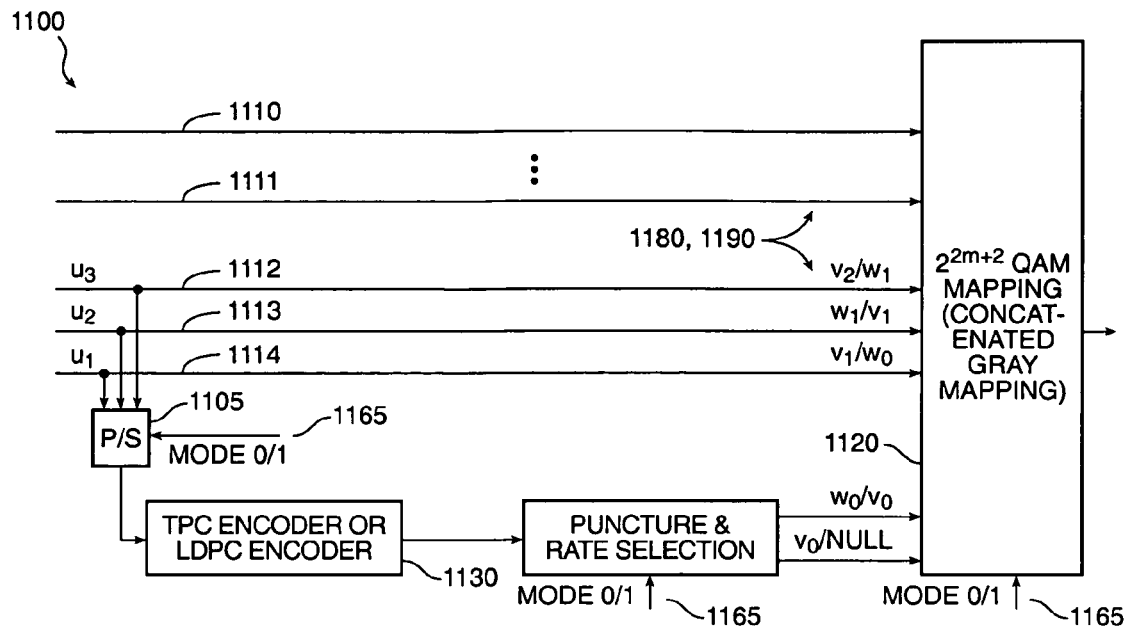
FIG. 11 is a block diagram of a universal turbo product or low-density parity check coding system using mode control with coding rates 2m/(2m+2) and (2m+1)/(2m+2), where m>0, in accordance with a preferred embodiment.

Referring to FIG. 11, there is shown a block diagram of a universal turbo product or low-density parity check ("LDPC") coding system 1100 using a mode control signal 1165 with coding rates 2m/(2m+2) and (2m+1)/(2m+2), where m>0, in accordance with another embodiment of the invention. In this embodiment, a turbo product code or LDPC encoder 1130, with mode control signal 1165, for the coding rates 2m/(2m+2) and (2m+1)/(2m+2) is employed.

Extension Case: More Coded Bits for Turbo Codes with Coding Rate R=2m/(2m+2). Although the number of coded bits to be mapped to Q is preferably two as described in the preceding embodiments, this number is not limited to two and may be greater. However, in practice, coding more than six bits may be counterproductive as the puncturing required may lead to diminished performance of the turbo code.

Figure 12:
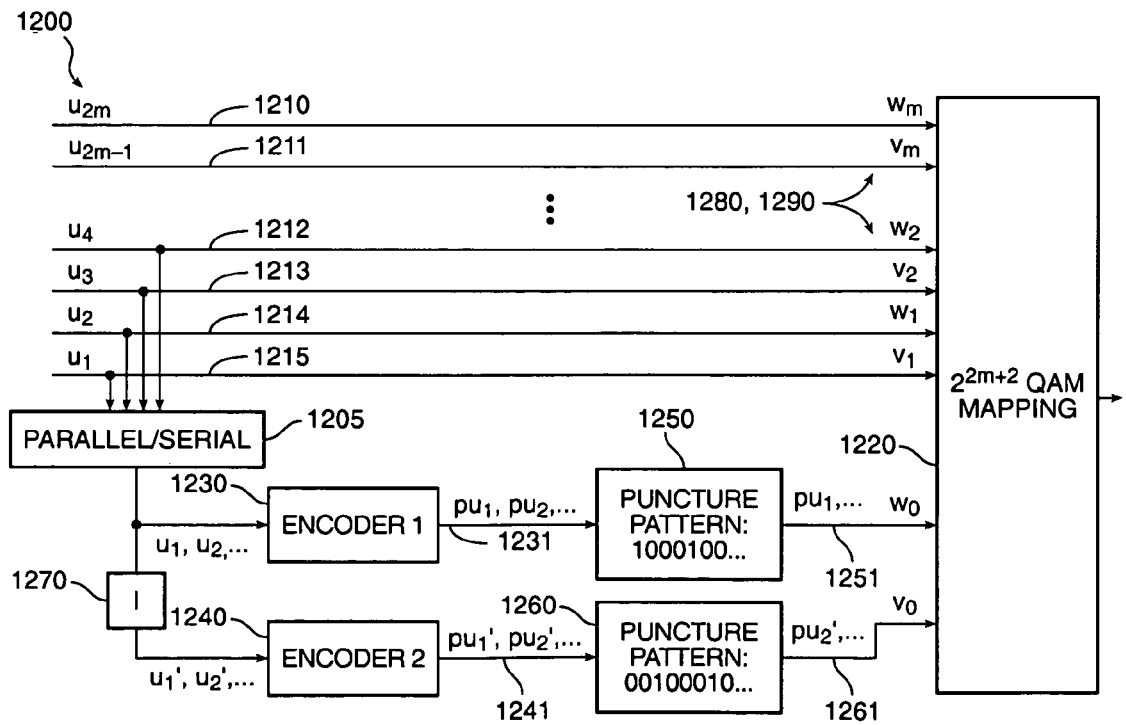
FIG. 12 is a block diagram of a turbo coding system with coding rate 2m/(2m+2), where m>0, where the six least significant bits are encoded by turbo codes, and where the puncturing rate is ¾, in accordance with a preferred embodiment.

Referring to FIG. 12, there is shown a block diagram of a turbo coding system 1200 with coding rate 2m/(2m+2), where m>0, where the four least significant bits are encoded by turbo codes, and where the puncturing rate is ¾, in accordance with another embodiment of the invention. In this embodiment, three coded bits are used in PAM mapping. Four information bits 1212, 1213, 1214, 1215 are inputted to two turbo encoders 1230, 1240 generating eight parity bits.

At the output 1231, 1241 of the two encoders 1230, 1240, the parity bits are punctured by puncturing units 1250, 1260 with puncturing rate ¾ (i.e., three parity bits are punctured out of four bits). The puncturing phases for the two encoders 1230, 1240 are offset by two bits. For every four information bits ($u_1$, $u_2$, $u_3$, $u_4$) 1212, 1213, 1214, 1215, two parity bits ($w_0$, $v_0$) 1251, 1261 remain after puncturing. The two vectors ($v_0$, $v_1$, ... $v_m$) and ($w_0$, $w_1$, ..., $w_m$) 1280, 1290 are mapped by the QAM mapper 1220 into two $2^{m+1}$-ASK signals independently using "concatenated Gray mapping". The coded bits ($v_0$, $v_1$, $v_2$) (or ($w_0$, $w_1$, $w_2$)) consisting of systematic bits ($v_1$, $v_2$) (or ($w_1$, $w_2$)) and one parity bit $v_0$ (or $w_0$) use Gray mapping and the uncoded bits ($v_3$, $v_4$, ..., $v_m$) (or ($w_3$, $w_4$, ..., $w_m$)) use Gray mapping.

TABLE 14 through TABLE 18 below illustrate the relationship between QAM size, parallel bits and encoded bits, and puncturing pattern and puncturing rate. In these tables, the subscript of the symbol "d" represents the index of QAM symbols in the time domain. In addition, other codes such as LDPC codes and product turbo codes may be used in the manner of the embodiment described above in association with FIG. 9 but where the input bits are ($u_1$, $u_2$, $u_3$, $u_4$). The turbo coded QAM system of this embodiment may be used for at least the following:

1. Coding rate 4/6 64QAM with bandwidth efficiency of 4 bits/Hz;

2. Coding rate 6/8 256QAM with bandwidth efficiency of 6 bits/Hz;

3. Coding rate 8/10 1024QAM with bandwidth efficiency of 8 bits/Hz;

4. Coding rate 10/12 4096QAM with bandwidth efficiency of 10 bits/Hz; and

5. Coding rate 12/14 16384QAM with bandwidth efficiency of 12 bits/Hz.

As mentioned above, this system may be extended to encode six information bits by using a puncturing rate of 5/6 with an offset of three bits.

TABLE 14

Puncturing and Mapping for 64QAM with Rate 4/6 (transmitting 4 bits)

| | | | | |
|---|---|---|---|---|
| Information data $d_k$ | | $d_1^1, d_2^1, d_3^1, d_4^1$ | | |
| Encoder input data | $d_1^1$ | $d_2^1$ | $d_3^1$ | $d_4^1$ |
| Parity bit from encoder 1 | $p_1^1$ | — | — | — |
| Parity bit from encoder 2 | — | — | $p_3^1$ | — |
| 8ASK symbol (I) | | ($d_3^1, d_1^1, p_1^1$) | | |
| 8ASK symbol (Q) | | ($d_4^1, d_2^1, p_3^1$) | | |
| 64QAM | | ($d_3^1, d_1^1, p_1^1, d_4^1, d_2^1, p_3^1$) | | |

TABLE 15

Puncturing and Mapping for 256QAM with Rate 6/8 (transmitting 6 bits)

| | | | | |
|---|---|---|---|---|
| Information data $d_k$ | | $d_1^1, d_2^1, d_3^1, d_4^1, d_5^1, d_6^{1*}$ | | |
| Encoder input data | $d_1^1$ | $d_2^1$ | $d_3^1$ | $d_4^1$ |
| Parity bit from encoder 1 | $p_1^1$ | — | — | — |
| Parity bit from encoder 2 | — | — | $p_3^1$ | — |
| 16ASK symbol (I) | | ($d_5^1, d_3^1, d_1^1, p_1^1$) | | |
| 16ASK symbol (Q) | | ($d_6^1, d_4^1, d_2^1, p_3^1$) | | |
| 256QAM | | ($d_5^1, d_3^1, d_1^1, p_1^1, d_6^1, d_4^1, d_2^1, p_3^1$) | | |

*NOTE:
$d_5^1$, $d_6^1$ do not go through the convolutional encoder in order to reduce the decoder complexity

TABLE 16

Puncturing and Mapping for 1024QAM with Rate 8/10 (transmitting 8 bits)

| | |
|---|---|
| Information data $d_k$ | $d_1^1, d_2^1, d_3^1, d_4^1, d_5^1, d_6^1, d_7^1, d_8^{1*}$ |
| Encoder input data | $d_1^1 \quad d_2^1 \quad d_3^1 \quad d_4^1$ |
| Parity bit from encoder 1 | $p_1^1 \quad — \quad — \quad —$ |
| Parity bit from encoder 2 | $— \quad — \quad p_3^1 \quad —$ |
| 32ASK symbol (I) | $(d_7^1, d_5^1, d_3^1, d_1^1, p_1^1)$ |
| 32ASK symbol (Q) | $(d_8^1, d_6^1, d_4^1, d_2^1, p_3^1)$ |
| 1024QAM | $(d_7^1, d_5^1, d_3^1, d_1^1, p_1^1,$ |
| | $d_8^1, d_6^1, d_4^1, d_2^1, p_3^1)$ |

*NOTE:
$d_5^1, d_6^1, d_7^1, d_8^1$ do not go through the convolutional encoder in order to reduce the decoder complexity

TABLE 17

Puncturing and Mapping for 4096QAM with Rate 10/12 (transmitting 10 bits)

| | |
|---|---|
| Information data $d_k$ | $d_1^1, d_2^1, d_3^1, d_4^1, d_5^1, \ldots, d_9^1, d_{10}^{1*}$ |
| Encoder input data | $d_1^1 \quad d_2^1 \quad d_3^1 \quad d_4^1$ |
| Parity bit from encoder 1 | $p_1^1 \quad — \quad — \quad —$ |
| Parity bit from encoder 2 | $— \quad — \quad p_3^1 \quad —$ |
| 64ASK symbol (I) | $(d_9^1, d_7^1, d_5^1, d_3^1, d_1^1, p_1^1)$ |
| 64ASK symbol (Q) | $(d_{10}^1, d_8^1, d_6^1, d_4^1, d_2^1, p_3^1)$ |
| 4096QAM | $(d_9^1, d_7^1, d_5^1, d_3^1, d_1^1, p_1^1,$ |
| | $d_{10}^1, d_8^1, d_6^1, d_4^1, d_2^1, p_3^1)$ |

*NOTE:
$d_5^1, d_6^1, \ldots, d_9^1, d_{10}^1$ do not go through the convolutional encoder in order to reduce the decoder complexity

TABLE 18

Puncturing and Mapping for 16384QAM with Rate 12/14 (transmitting 12 bits)

| | |
|---|---|
| Information data $d_k$ | $d_1^1, d_2^1, d_3^1, d_4^1, d_5^1, \ldots, d_{11}^1, d_{12}^{1*}$ |
| Encoder input data | $d_1^1 \quad d_2^1 \quad d_3^1 \quad d_4^1$ |
| Parity bit from encoder 1 | $p_1^1 \quad — \quad — \quad —$ |
| Parity bit from encoder 2 | $— \quad — \quad p_3^1 \quad —$ |
| 64ASK symbol (I) | $(d_{11}^1, d_9^1, d_7^1, d_5^1, d_3^1, d_1^1, p_1^1)$ |
| 64ASK symbol (Q) | $(d_{12}^1, d_{10}^1, d_8^1, d_6^1, d_4^1, d_2^1, p_3^1)$ |
| 4096QAM | $(d_{11}^1, d_9^1, d_7^1, d_5^1, d_3^1, d_1^1, p_1^1,$ |
| | $d_{12}^1, d_{10}^1, d_8^1, d_6^1, d_4^1, d_2^1, p_3^1)$ |

Figure 13:
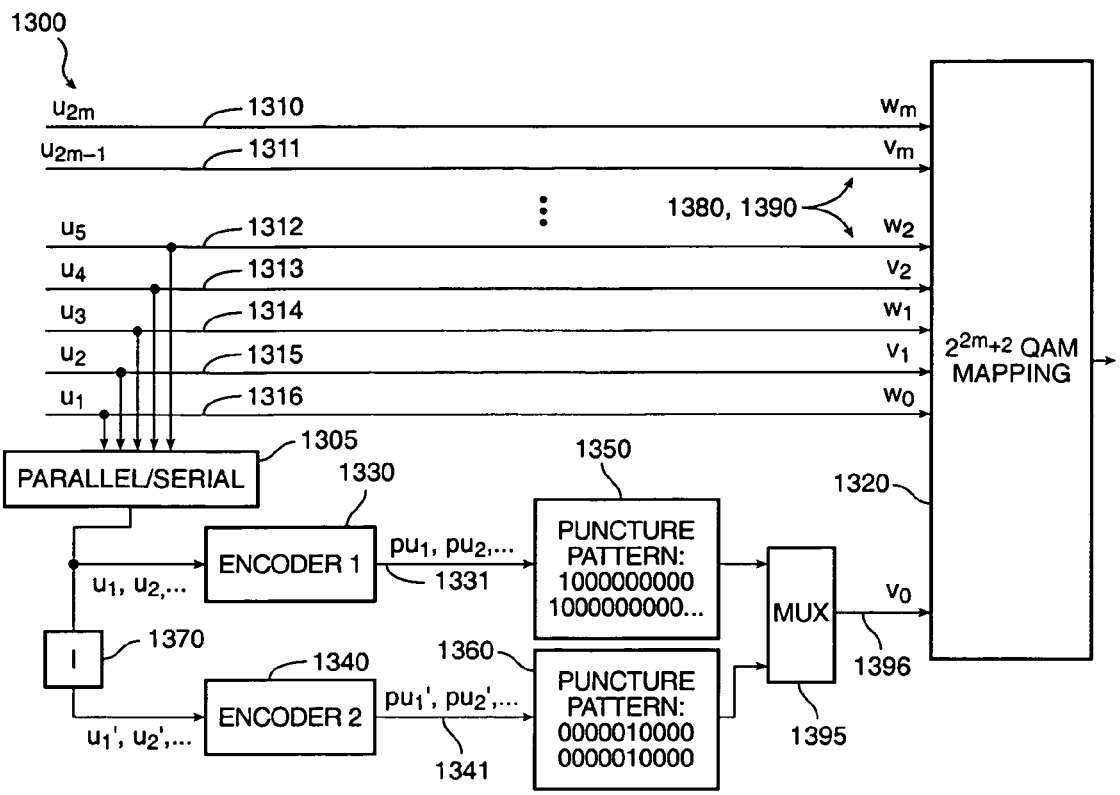
FIG. 13 is a block diagram of a turbo coding system with coding rate (2m+1)/(2m+2), where m>0, where the six least significant bits are encoded by turbo codes, and where the puncturing rate is 9/10 in accordance with a preferred embodiment.

*NOTE:
$d_5^1, d_6^1, \ldots, d_{11}^1, d_{12}^1$ do not go through the convolutional encoder in order to reduce the decoder complexity Extension Case: More Coded Bits of Turbo Codes with Coding Rate R=(2m+1)/(2m+2). Referring to FIG. 13, there is shown a block diagram of a turbo coding system 1300 with coding rate (2m+1)/(2m+2), where m>0, where the six least significant bits are encoded by turbo codes, and where the puncturing rate is 9/10, in accordance with another embodiment of the invention. In this embodiment, three coded bits are again used in PAM mapping. Five information bits 1312, 1313, 1314, 1315, 1316 are inputted to two turbo encoders 1330, 1340 generating ten parity bits. At the outputs 1331, 1341 of the two encoders 1330, 1340, the parity bits are punctured by the puncturing units 1350, 1360 with puncturing rate 9/10 (i.e., nine parity bits are punctured out of ten bits). The puncturing phases for the two encoders 1330, 1340 are offset by five bits. For every five information bits ($u_1, u_2, u_3, u_4, u_5$) 1313, 1313, 1314, 1315, 1316, one parity bit $v_0$ 1396 is left after puncturing by the puncturing units 1350, 1360. The two vectors ($v_0, v_1, \ldots, v_m$) and ($w_0, w_1, \ldots, w_m$) 1380, 1390 will be mapped 1320 into two $2^{m+1}$-ASK signals independently using "concatenated Gray mapping". The coded bits ($v_0, v_1, v_2$) consisting of systematic bits ($v_1, v_2$) and one parity bit $v_0$ use Gray mapping, the coded bits (systematic bits only) ($w_0, w_1, w_2$) use Gray mapping, and the uncoded bits ($v_3, v_4, \ldots, v_m$) (or ($w_3, w_4, \ldots, w_m$)) use Gray mapping.

TABLE 19 through TABLE 23 below illustrate the relationship between QAM size, parallel bits and encoded bits, and puncturing pattern and puncturing rate. In these tables, the subscript of the symbol "d" represents the index of QAM symbols in the time domain. In addition, other codes such as LDPC codes and product turbo codes may be used in the manner of the embodiment described above in association with FIG. 10 but where the input bits are ($u_1, u_2, u_3, u_4, u_5$). The turbo coded QAM system of this embodiment may be used for at least the following:

1. Coding rate 5/6 64QAM with bandwidth efficiency of 5 bits/Hz;

2. Coding rate 7/8 256QAM with bandwidth efficiency of 7 bits/Hz;

3. Coding rate 9/10 1024QAM with bandwidth efficiency of 9 bits/Hz;

4. Coding rate 11/12 4096QAM with bandwidth efficiency of 11 bits/Hz; and

5. Coding rate 13/14 16384QAM with bandwidth efficiency of 13 bits/Hz.

Again, this system may be extended to coding seven information bits by using a puncturing rate of 13/14 with an offset of 7 bits.

Furthermore, and in the manner of the embodiment described above in association with FIG. 8, a universal implementation may be obtained for the embodiments described in association with FIG. 12 and FIG. 13 for turbo codes. Moreover, and in the manner of the embodiment described above in association with FIG. 11, a universal implementation may be obtained for the embodiments described in association with FIG. 12 and FIG. 13 for LDPC and product codes.

TABLE 19

Puncturing and Mapping for 64QAM with Rate 5/6 (transmitting 5 bits)

| | | |
|---|---|---|
| Information data $d_k$ | $d_1^1, d_2^1, d_3^1, d_4^1, d_5^1$ | $d_1^2, d_2^2, d_3^2, d_4^2, d_5^2$ |
| Encoder input data | $d_1^1 \ d_2^1 \ d_3^1 \ d_4^1 \ d_5^1$ | $d_1^2 \ d_2^2 \ d_3^2 \ d_4^2 \ d_5^2$ |
| Parity bit from encoder 1 | $p_3^1$ | |
| Parity bit from encoder 2 | | $p_3^2$ |
| 8ASK symbol (I) | $(d_5^1, d_3^1, d_1^1)$ | $(d_5^2, d_3^2, d_1^2)$ |
| 8ASK symbol (Q) | $(d_4^1, d_2^1, p_3^1)$ | $(d_4^2, d_2^2, p_3^2)$ |
| 64QAM | $(d_5^1, d_3^1, d_1^1,$ | $(d_5^2, d_3^2, d_1^2,$ |
| | $d_4^1, d_2^1, p_3^1)$ | $d_4^2, d_2^2, p_3^2)$ |

TABLE 20

Puncturing and Mapping for 256QAM with Rate 7/8 (transmitting 7 bits)

| | | |
|---|---|---|
| Information data $d_k$ | $d_1^1, d_2^1, d_3^1, d_4^1, d_5^1,$ | $d_1^2, d_2^2, d_3^2, d_4^2, d_5^2,$ |
| | $\ldots, d_7^{1*}$ | $\ldots, d_7^{2*}$ |
| Encoder input data | $d_1^1 \ d_2^1 \ d_3^1 \ d_4^1 \ d_5^1$ | $d_1^2 \ d_2^2 \ d_3^2 \ d_4^2 \ d_5^2$ |
| Parity bit from encoder 1 | $p_3^1$ | |
| Parity bit from encoder 2 | | $p_3^2$ |
| 8ASK symbol (I) | $(d_7^1, d_5^1, d_3^1, d_1^1)$ | $(d_7^2, d_5^2, d_3^2, d_1^2)$ |
| 8ASK symbol (Q) | $(d_6^1, d_4^1, d_2^1, p_3^1)$ | $(d_6^2, d_4^2, d_2^2, p_3^2)$ |
| 64QAM | $(d_7^1, d_5^1, d_3^1, d_1^1,$ | $(d_7^2, d_5^2, d_3^2, d_1^2,$ |
| | $d_6^1, d_4^1, d_2^1, p_3^1)$ | $d_6^2, d_4^2, d_2^2, p_3^2)$ |

*NOTE:
$d_6^1, d_7^1, d_6^2, d_7^2$ do not go through the convolutional encoder in order to reduce the decoder complexity

TABLE 21

Puncturing and Mapping for 1024QAM with Rate 9/10
(transmitting 9 bits)

| | | |
|---|---|---|
| Information data $d_k$ | $d_1^1, d_2^1, d_3^1, d_4^1, d_5^1,$ | $d_1^2, d_2^2, d_3^2, d_4^2, d_5^2,$ |
| | $\ldots, d_9^{1*}$ | $\ldots, d_9^{2*}$ |
| Encoder input data | $d_1^1\ d_2^1\ d_3^1\ d_4^1\ d_5^1$ | $d_1^2\ d_2^2\ d_3^2\ d_4^2\ d_5^2$ |
| Parity bit from encoder 1 | $p_3^1$ | |
| Parity bit from encoder 2 | | $p_3^2$ |
| 32ASK symbol (I) | $(d_9^1, d_7^1, d_5^1, d_3^1, d_1^1)$ | $(d_9^2, d_7^2, d_5^2, d_3^2, d_1^2)$ |
| 32ASK symbol (Q) | $(d_8^1, d_6^1, d_4^1, d_2^1, p_3^1)$ | $(d_8^2, d_6^2, d_4^2, d_2^2, p_3^2)$ |
| 1024QAM | $(d_9^1, d_7^1, d_5^1, d_3^1, d_1^1,$ | $(d_9^2, d_7^2, d_5^2, d_3^2, d_1^2,$ |
| | $d_8^1, d_6^1, d_4^1, d_2^1, p_3^1)$ | $d_8^2, d_6^2, d_4^2, d_2^2, p_3^2)$ |

*NOTE:
$d_6^1, d_7^1, d_8^1, d_9^1, d_6^2, d_7^2, d_8^2, d_9^2$ do not go through the convolutional encoder in order to reduce the decoder complexity

TABLE 22

Puncturing and Mapping for 4096QAM with Rate 11/12
(transmitting 11 bits)

| | | |
|---|---|---|
| Information data $d_k$ | $d_1^1, d_2^1, d_3^1, d_4^1, d_5^1,$ | $d_1^2, d_2^2, d_3^2, d_4^2, d_5^2,$ |
| | $\ldots, d_{11}^{1*}$ | $\ldots, d_{11}^{2*}$ |
| Encoder input data | $d_1^1\ d_2^1\ d_3^1\ d_4^1\ d_5^1$ | $d_1^2\ d_2^2\ d_3^2\ d_4^2\ d_5^2$ |
| Parity bit from encoder 1 | $p_3^1$ | |
| Parity bit from encoder 2 | | $p_3^2$ |
| 32ASK symbol (I) | $(d_{11}^1, d_9^1, d_7^1, d_5^1,$ | $(d_{11}^2, d_9^2, d_7^2, d_5^2,$ |
| | $d_3^1, d_1^1)$ | $d_3^2, d_1^2)$ |
| 32ASK symbol (Q) | $(d_{10}^1, d_8^1, d_6^1, d_4^1,$ | $(d_{10}^2, d_8^2, d_6^2, d_4^2,$ |
| | $d_2^1, p_3^1)$ | $d_2^2, p_3^2)$ |
| 1024QAM | $(d_{11}^1, d_9^1, d_7^1, d_5^1,$ | $(d_{11}^2, d_9^2, d_7^2, d_5^2,$ |
| | $d_3^1, d_1^1, d_{10}^1, d_8^1,$ | $d_3^2, d_1^2, d_{10}^2, d_8^2,$ |
| | $d_6^1, d_4^1, d_2^1, p_3^1)$ | $d_6^2, d_4^2, d_2^2, p_3^2)$ |

*NOTE:
$d_6^1, d_7^1, \ldots, d_{11}^1$ and $d_6^2, d_7^2, \ldots, d_{11}^2$ do not go through the convolutional encoder in order to reduce the decoder complexity

TABLE 23

Puncturing and Mapping for 16384QAM with Rate 13/14
(transmitting 13 bits)

| | | |
|---|---|---|
| Information data $d_k$ | $d_1^1, d_2^1, d_3^1, d_4^1,$ | $d_1^2, d_2^2, d_3^2, d_4^2,$ |
| | $d_5^1, \ldots, d_{13}^{1*}$ | $d_5^2, \ldots, d_{13}^{2*}$ |
| Encoder input data | $d_1^1\ d_2^1\ d_3^1\ d_4^1\ d_5^1$ | $d_1^2\ d_2^2\ d_3^2\ d_4^2\ d_5^2$ |
| Parity bit from encoder 1 | $p_3^1$ | |
| Parity bit from encoder 2 | | $p_3^2$ |
| 64ASK symbol (I) | $(d_{13}^1, d_{11}^1, d_9^1, d_7^1,$ | $(d_{13}^2, d_{11}^2, d_9^2, d_7^2,$ |
| | $d_5^1, d_3^1, d_1^1)$ | $d_5^2, d_3^2, d_1^2)$ |
| 64ASK symbol (Q) | $(d_{12}^1, d_{10}^1, d_8^1, d_6^1,$ | $(d_{12}^2, d_{10}^2, d_8^2, d_6^2,$ |
| | $d_4^1, d_2^1, p_3^1)$ | $d_4^2, d_2^2, p_3^2)$ |
| 16384QAM | $(d_{13}^1, d_{11}^1, d_9^1, d_7^1,$ | $(d_{13}^2, d_{11}^2, d_9^2, d_7^2,$ |
| | $d_5^1, d_3^1, d_1^1, d_{12}^1,$ | $d_5^2, d_3^2, d_1^2,$ |
| | $d_{10}^1, d_8^1, d_6^1, d_4^1,$ | $d_{12}^2, d_{10}^2, d_8^2, d_6^2,$ |
| | $d_2^1, p_3^1)$ | $d_4^2, d_2^2, p_3^2)$ |

*NOTE:
$d_6^1, d_7^1, \ldots, d_{13}^1$ and $d_6^2, d_7^2, \ldots, d_{13}^2$ do not go through the convolutional encoder in order to reduce the decoder complexity Referring to FIG. 8, the method of one embodiment of the invention will now be described. With this method turbo codes may be effectively used in ADSL communication systems. At a Step 1, M information bits 810, 811, 812, 813, 814 to be transmitted over an ADSL communication system are divided into two categories: encoding bits 812, 813, 814 and parallel bits 810, 811.

At a Step 2, after parallel-to-serial transfer by the P/S unit 805, the encoding bits 812, 813, 814 are passed into a turbo encoder 830. The parallel bits 810, 811 bypass the turbo encoder 830. The encoder outputs, after puncturing by the puncturing unit 850, are coded bits which consist of systematic bits and parity bits (i.e., either all parity bits or partial parity bits). Alternate turbo codes such as serial concatenated turbo codes or multiple turbo codes may be used. Rather than using a turbo encoder, turbo product codes or LDPC codes may be used.

At a Step 3, the coded bits and parallel bits are mapped by the QAM mapper 820 into two PAM signals. For small PAM, there are no parallel bits. The coded bits are used as least significant bits, and the parallel bits are used as the most significant bits. The number of coded bits to be mapped to PAM is preferably two for transmitting an even number of bits and preferably three for transmitting an odd number of bits. The mapping of coded bits and parallel bits to PAM signals is performed using concatenated Gray mapping where concatenated Gray mapping is a serial concatenation of an inner Gray mapping and an outer Gray mapping. The inner Gray mapping is used for the coded bits. The outer Gray mapping is used for the parallel bits. To transmit an even number of bits, say M=2m bits, preferably 2m−2 bits of the total 2m bits are parallel bits that will bypass the turbo encoder. The remaining preferably 2 bits will pass through the turbo encoder. Two parity bits are generated after puncturing. In this case, the overall bandwidth efficiency is 2m bits/Hz using QAM. To transmit an odd number of bits, say M=2m+1 bits, preferably 2m−2 bits of the total 2m+1 bits are parallel bits that will bypass the turbo encoder. The remaining preferably 3 bits will pass through the turbo encoder. One parity bit is generated after puncturing. In this case, the overall bandwidth efficiency is 2m+1 bits/Hz using QAM. Mode control signal 865 may be employed in which a first mode may be used for transmitting an even number of bits and a second mode may be used for transmitting an odd number of bits. Although the number of coded bits to be mapped to PAM is preferably two, this number may be greater than two.

At a Step 4, a QAM signal is generated by the QAM mapper 820 from the two PAM signals, one for the real part and the other for the imaginary part. The QAM signal is then transmitted over the ADSL communication system.

G.lite and G.dmt ADSL. There have been a number of proposals to apply powerful turbo coding and decoding techniques to G.lite and G.dmt ADSL to improve transmission rate and loop reach (refer to C. Berrou and A. Glavieux, "Near Optimum Error Correcting Coding and Decoding: Turbo-Codes", IEEE Trans. Commun., vol. COM-44, No. 10, October 1996, pp. 1261–1271). Among them, there are two typical turbo TCM schemes. The first is a symbol-level turbo TCM scheme which was proposed by Robertson and Worz (refer to P. Robertson and T. Worz, "Bandwidth-Efficient Turbo Trellis-Coded Modulation Using Punctured Component Codes", IEEE J-SAC, vol. 16, No. 2, February 1998, pp. 206–218; and "Performance Simulation Results on Turbo Coding", ITU Standard Contribution, NT-112, Nashville, U.S.A., November 1999). The other is a bit-level turbo TCM scheme (refer to "Proposed Evaluation of Proposed TTCM (PCCC) with R-S Code and without R-S Code", ITU Standard Contribution, D.748 (WP1/15), Geneva, Switzerland, April 2000; "Proposal and Performance Evaluation of TTCM (PCCC) with R-S Code", ITU Standard Contribution, FI-122, Fiji Island, February 2000; and, "New Proposal of Turbo Codes for ADSL Modem", ITU Standard Contribution, BA-020, Antwerp, Belgium, June 2000). With respect to the bit-level scheme, several designs have been proposed (refer to S. Benedetto, D. Divsalar, G. Montorsi, and F. Pollara, "Parallel Concatenated Trellis Coded Modulation", IEEE ICC96, 1996, pp. 974–978).

Figure 14:
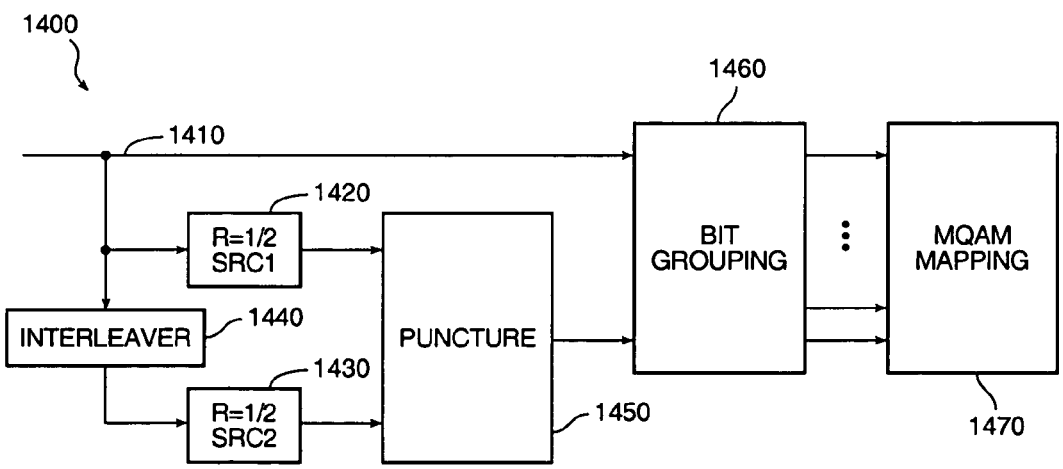
FIG. 14 is a block diagram of a bit level turbo TCM system in accordance with the prior art.

Referring to FIG. 14, there is shown a block diagram of a bit level turbo TCM system 1400 in accordance with the prior art. Information bits 1410 are encoded by two parallel concatenated recursive systematic convolutional encoders (RSCs) 1420, 1430 with an interleaver 1440 between their inputs. The two encoders are identical and have a coding rate of R=½. The respective sets of parity bits output from the encoders are punctured by a puncturing unit 1450 in a predetermined pattern in order to reduce the parity overhead. Then, the systematical information bits and parity bits are grouped by a bit grouper 1460 and subsequently mapped into a QAM constellation by QAM mapper 1470. Although this prior art scheme has good error performance, it also has some drawbacks including the following. First, all information bits are passed into the convolutional encoders for protection; therefore the number of trellis transitions is very large and the decoder is very complicated. Second, the puncturing and mapping patterns are different for different constellation sizes of QAM, which leads to high implementation complexity. Third, high coding rates cannot be obtained for large constellation sizes because over puncturing will damage the code; therefore high data rates cannot be achieved.

According to another embodiment of the invention, a universal turbo TCM system is provided which has both good error performance and low decoder complexity. In general, this TCM system includes a pair of recursive systematic convolutional (RSC) encoders for generating parity bits from input bits, an interleaver for interleaving input bits to the encoders, a puncture unit for determining a puncture rate of the parity bits in response to an even and odd number of information bits, and a bit grouping module for receiving the punctured bits and the input bits and grouping the bits for mapping into a symbol.

Figure 15:
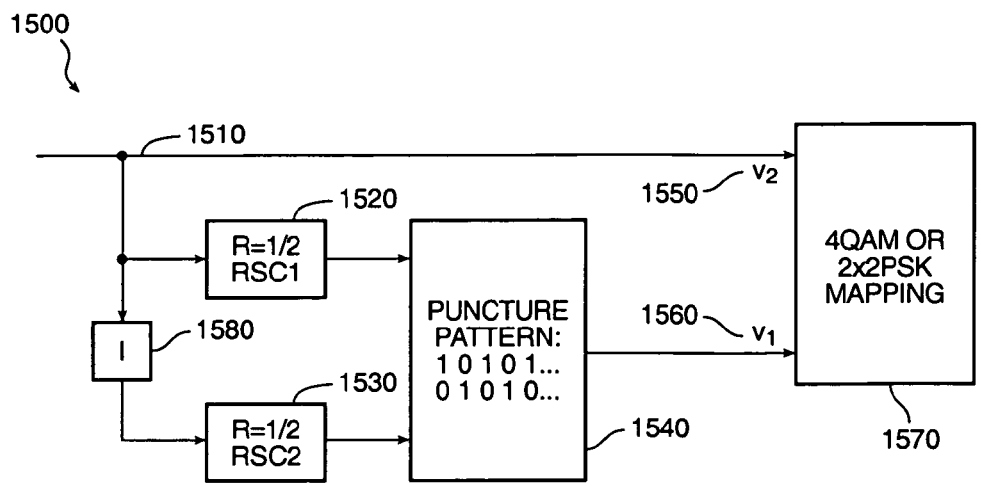
FIG. 15 is a block diagram of a turbo TCM encoder system with coding rate R=½ for 4QAM or a group of two 2QAM in accordance with a preferred embodiment.

Referring to FIG. 15, there is shown a block diagram of a turbo TCM encoder system 1500 with a coding rate of R=½ for 4QAM or a group of two 2QAM in accordance with another embodiment of the invention. This turbo TCM encoder may be used to transmit 1 bit in one 4QAM symbol or in two 2QAM symbols. For each information bit 1510, two parity bits are generated by two recursive systematic convolutional (RSC) encoders 1520, 1530. The parity bits generated by each RSC encoder are punctured by the puncturing unit 1540 alternatively; that is, one half of the total parity bits are punctured. The overall coding rate is R=½. For each information bit $V_2$ 1550, one parity bit $V_1$ 1560 is generated. $(V_1, V_2)$ are mapped by the QAM mapper 1570 into one 4QAM symbol using Gray mapping. The system includes an interleaver 1580 between the two encoders 1520, 1530.

Figure 16:
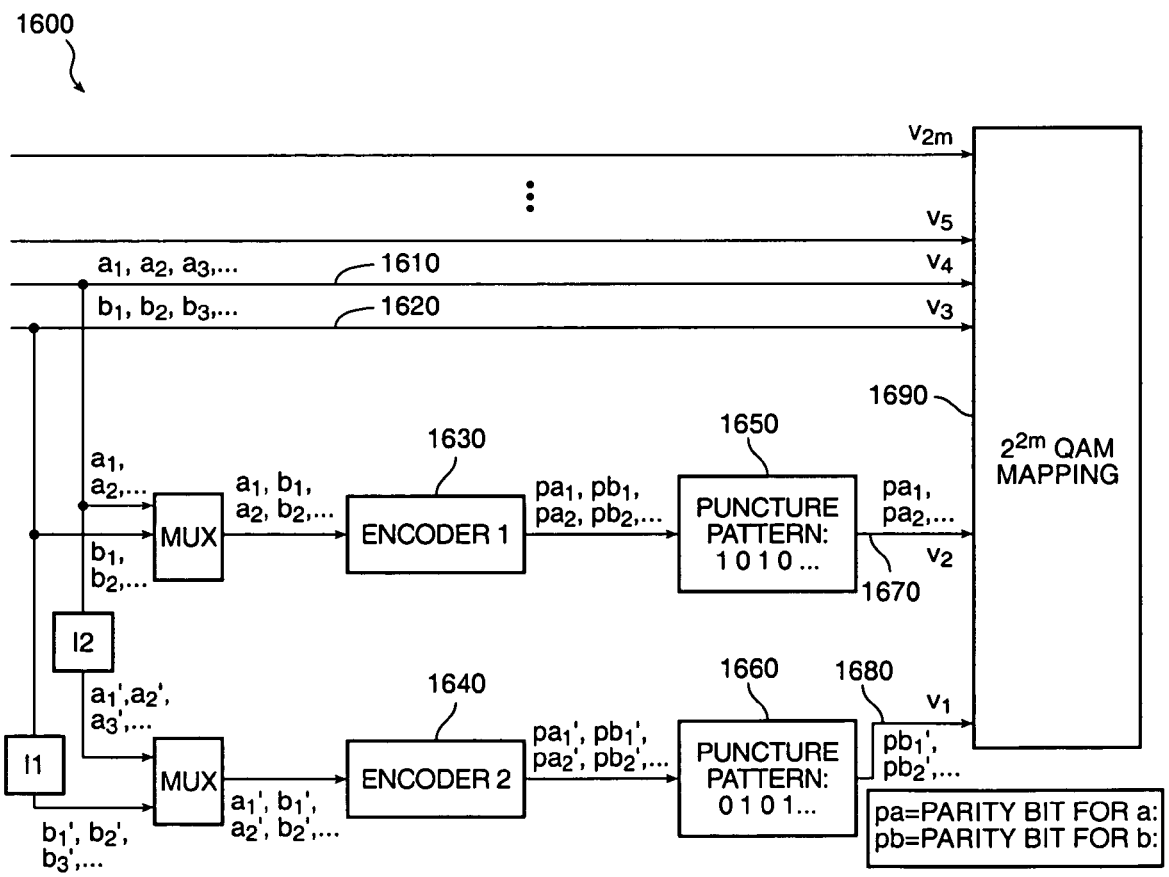
FIG. 16 is a block diagram of a turbo TCM encoder system with coding rate R=(2+2m)/(4+2m) for MQAM, where M16 and M=2m, in accordance with a preferred embodiment.

Referring to FIG. 16, there is shown a block diagram of a turbo TCM encoder system 1600 with a coding rate of R=(2+2m)/(4+2m) for MQAM, where M16 and M=2m, in accordance with another embodiment of the invention. This turbo TCM encoder system may be used to transmit an even number of information bits in one QAM symbol. For every two information bits $(V_3, V_4)$ 1610, 1620 passed into the RSC encoders 1630, 1640, four parity bits are generated by these encoders. The parity bits generated by each RSC encoder are punctured alternatively, that is, one half of the total parity bits are punctured by the puncturing units 1650, 1660. For every two information bits $(V_3, V_4)$ 1610, 1620, two parity bits $(V_1, V_2)$ 1670, 1680 are generated. $(V_1, V_2, \ldots, V_{2m})$ are mapped by the QAM mapper 1690 into one QAM symbol using set-partition mapping (refer to G. Ungerboeck, "Channel Coding with Multilevel/Phase Signals", IEEE Trans. Inform. Theory, vol. IT-28, No. 1, January 1982, pp. 55–67) and Gray mapping. It is preferable that this mapping be operated in one dimension; that is, two halves of $(V_1, V_2, \ldots, V_{2m})$ are mapped into two 2m-ASK signals. This system may be used for at least the following: coding rate ⅔ 16QAM; coding rate ⅘ 64QAM; coding rate ⅚ 256QAM; coding rate ⁸⁄₁₀ 1024QAM; coding rate ¹⁰⁄₁₂ 4096QAM; and coding rate ¹²⁄₁₄ 16384QAM.

Figure 17:
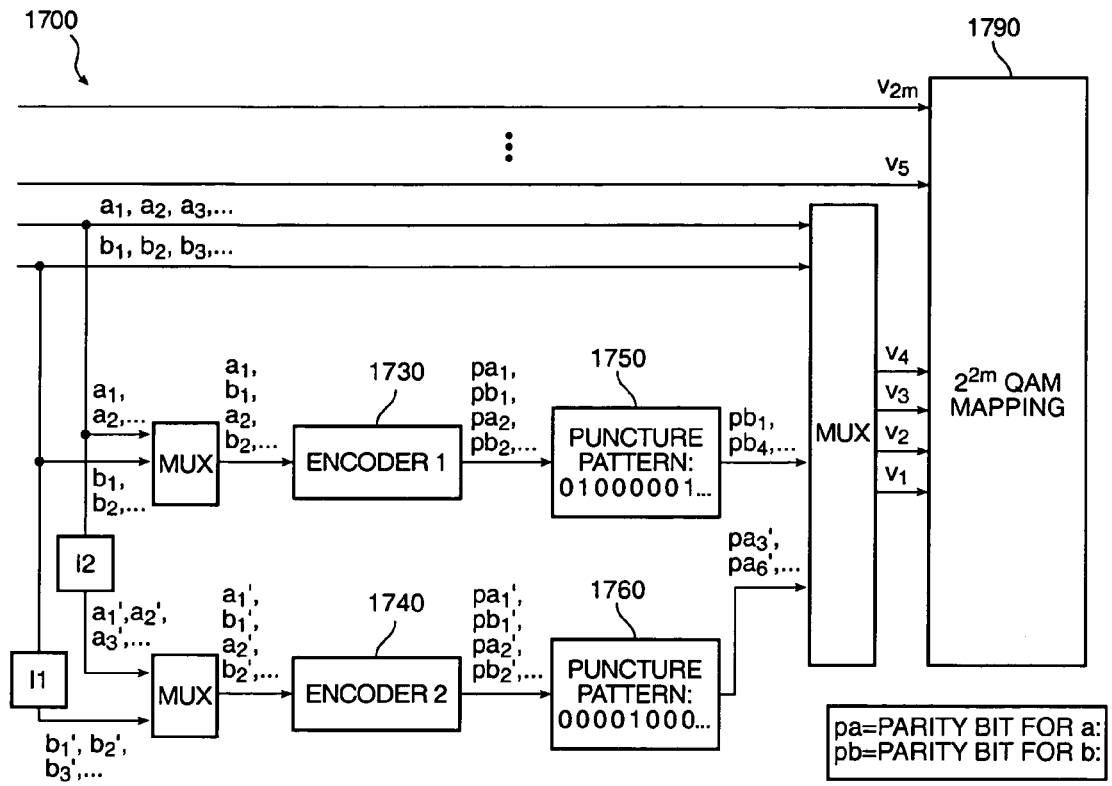
FIG. 17 is a block diagram of a turbo TCM encoder system with coding rate R=(3+2m)/(4+2m) for MQAM, where M16 and M=2m.

Referring to FIG. 17, there is shown a block diagram of a turbo TCM encoder system 1700 with a coding rate of R=(3+2m)/(4+2m) for MQAM, where M16 and M=2m, in accordance with another embodiment of the invention. This turbo TCM encoder system may is used to transmit an odd number of information bits in one QAM symbol. For every 3 information bits passed into the two RSC encoders 1730, 1740 (after interleaving and multiplexing as shown), 6 parity bits are generated by the two encoders. The parity bits generated by each RSC encoder are punctured by the puncturing units 1750, 1760 with a puncturing rate of ⅚; that is, 5 of 6 parity bits are punctured. For every three information bits $(V_2, V_3, V_4)$, one parity bit $V_1$ is generated. $(V_1, V_2, \ldots, V_{2m})$ are mapped by the QAM mapp 1790 into one QAM symbol using set-partition mapping and Gray mapping. It is preferable that this mapping be operated in one dimension; that is, two halves of $(V_1, V_2, \ldots, V_{2m})$ are mapped into two 2m-ASK signals. This system may be used for at least the following: coding rate ¾ 16QAM; coding rate ⅚ 64QAM; coding rate ⅞ 256QAM; coding rate ⁹⁄₁₀ 1024QAM; coding rate ¹¹⁄₁₂ 4096QAM; and coding rate ¹³⁄₁₄ 16384QAM.

Figure 18:
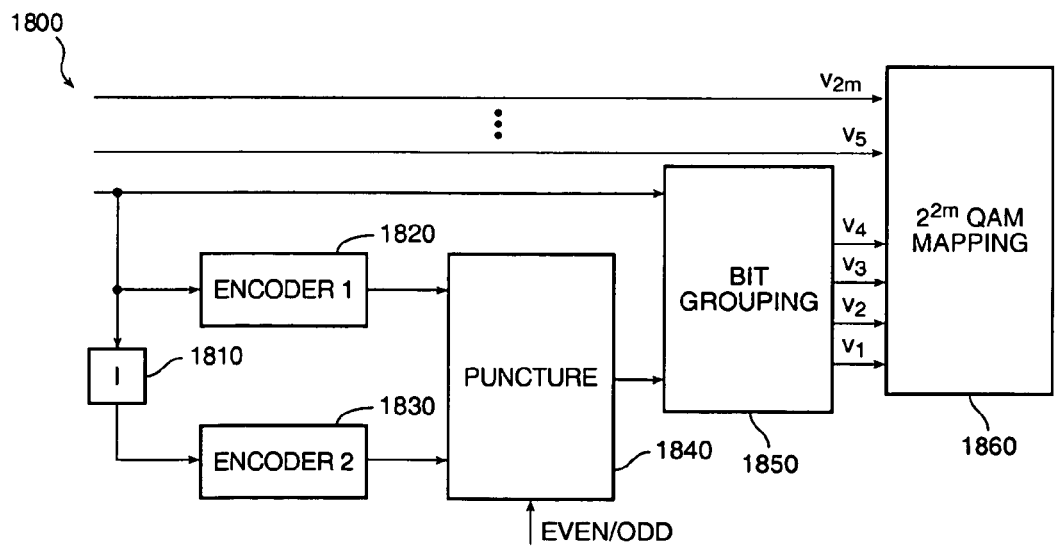
FIG. 18 is a block diagram of a universal turbo TCM encoder system MQAM in accordance with a preferred embodiment.

Referring to FIG. 18, there is shown a block diagram of a universal turbo TCM encoder system 1800 for MQAM in accordance with another embodiment of the invention. Here, the data paths of the systems 1600 and 1700 are combined via the interleaver 1810 which interleaves the bits at even numbered positions to even numbered positions and the bits at odd numbered positions to odd numbered positions. The puncture rate used by the puncturing unit 1840 for each RSC encoder 1820, 1830 is either ½ or ⅚ which is selected based on the even or odd status of the number of information bits. The information bits are passed into the RSC encoders 1820, 1830 and their parity bits are grouped by the bit grouper 1850 into 4-bit by 4-bit for MQAM (M>4) or they are grouped by the bit grouper 1850 into 2-bit by 2-bit for 4QAM. In general, this embodiment of the invention includes the following: a pair of recursive systematic convolutional (RSC) encoders 1820, 1830 for generating parity bits from input bits; an interleaver 1810 for interleaving input bits to the encoders; a puncture unit 1840 for determining a puncture rate for the parity bits in response to the even or odd status of the number of information bits; and a bit grouping module 1850 for receiving the punctured bits and the input bits and grouping the bits for mapping into a symbol. The interleaver 1810 may include a pair of interleavers. This pair of interleavers may be implemented by an interleaver with even and odd patterns. The mapping unit 1860 may implement mapping one two-dimensional QAM into two one-dimensional ASK. The mapping unit 1860 may implement a mixed Gray mapping and set partition mapping, and the mapping unit 1860 may implement concatenated Gray mapping.

For embodiments of the invention including systems 1600, 1700, and 1800, and with reference to the discussion of concatenated Gray mapping and FIG. 2 above, note that two unique mapping schemes may be employed to achieve better error performance. The first mapping scheme may be a mixed Gray mapping with set partition mapping. With this mapping scheme, the mapping of $(V_1, V_2, \ldots, V_{2m})$ into $2^{2m}$QAM is operated by mapping each half of $(V_1, V_2, \ldots, V_{2m})$ into one 2m-ASK signal. For example, $(V_1, V_3, \ldots, V_{2m-1})$ may be mapped into one 2m-ASK signal and $(V_2, V_4, \ldots, V_{2m})$ may be mapped into another 2m-ASK signal. Again, FIG. 2 illustrates this unique mapping (i.e., set partition plus Gray mapping) for 4-ASK 210 and 8-ASK 220. For 4-ASK 210, Gray mapping is employed. For 8-ASK 220, the first most significant bit employs set partition mapping and the two least significant bits employ Gray mapping. For general 2m-ASK, the first (m−2) most significant bits employ set partition mapping and the two least significant bits employ Gray mapping. For example, suppose that B1, B2, . . . , B2m are a mapping for 2m-ASK (m>1), where Bk (1k2m) is a n m-bit string, then the mapping for 2m+1-ASK may be generated as 1B1, 1B2, . . . , 1B2m, 0B1, 0B2, . . . , 0B2m; that is, a 1 bit is appended to all B1, B2, . . . , B2m to obtain the first half and a 0 bit is appended to all B1, B2, . . . , B2m to obtain the second half. The second unique mapping scheme may be concatenated Gray mapping. With this second scheme, both the coded bits, such as $(V_1, V_3)$ or $(V_2, V_4)$, and the uncoded bits, such as $(V_5, V_7, \ldots, V_{2m-1})$ or $(V_6, V_8, \ldots, V_{2m})$, both employ Gray mapping and these mappings are concatenated. For example, for m=4, both $(V_1, V_3)$ and $(V_5, V_7)$ are Gray mappings. The concatenated Gray code is illustrated in line diagram 230 of FIG. 2. The two least significant bits are the Gray mapping of coded bits $(V_1, V_3)$, which will repeat every four mappings. The two most significant bits are the Gray mapping of the uncoded bits $(V_5, V_7)$, which are the same for each group of 4 mappings.

Figure 19:
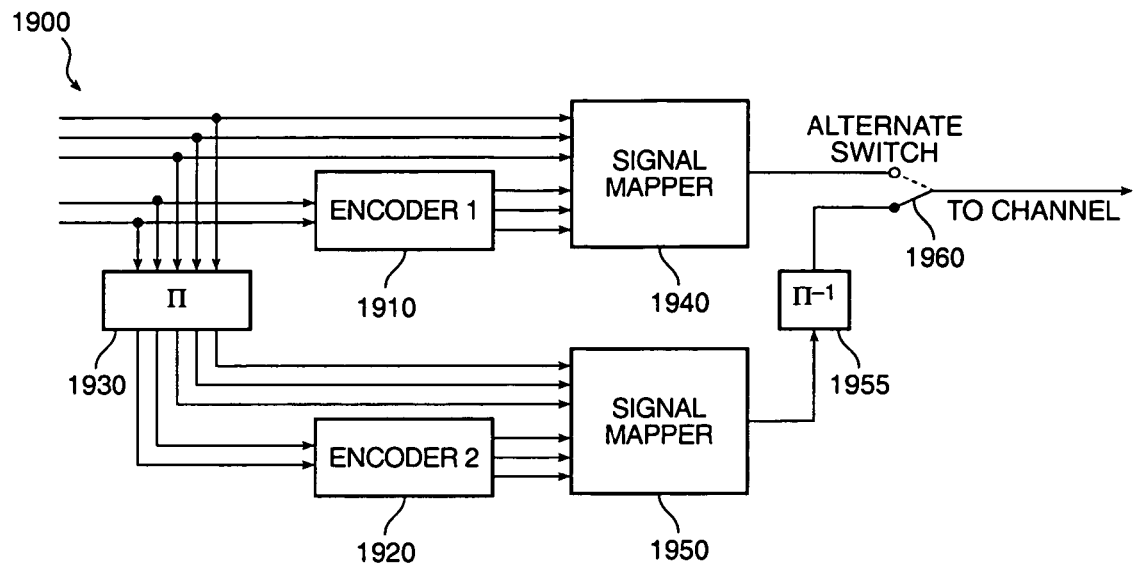
FIG. 19 is a block diagram of a symbol level turbo TCM system in accordance with the prior art.

Function Block for Small Constellation Sizes. Referring to FIG. 19, there is shown a block diagram of a turbo TCM system 1900 in accordance with the prior art (refer to D. V. Bruyssel, "G.gen: Performance Simulation Results on Turbo Coding", ITU Telecommunication Standardization Sector NT-112, Nashville, Tenn., Nov. 1–5, 1999). In this scheme, parallel bit streams pass through two parallel convolutional encoders 1910, 1920. The scheme includes an interleaver 1930 located between the encoders. Two sets of coded bits are mapped by the signal mappers 1940, 1950 into a constellation point independently. The mapped bits from the signal mapper 1950 are then inverse interleaved by the inverse interleaver 1955. These points are then alternately passed to the channel by the switch 1960, that is, one constellation point is punctured out for a given DMT symbol. One drawback with this scheme is that it can only support a minimum constellation of size of eight; that is, it cannot map to bins or subchannels with smaller constellation sizes of, say, two or four. This may become problematic as loop reach increases and SNR are lowered.

Figure 20:
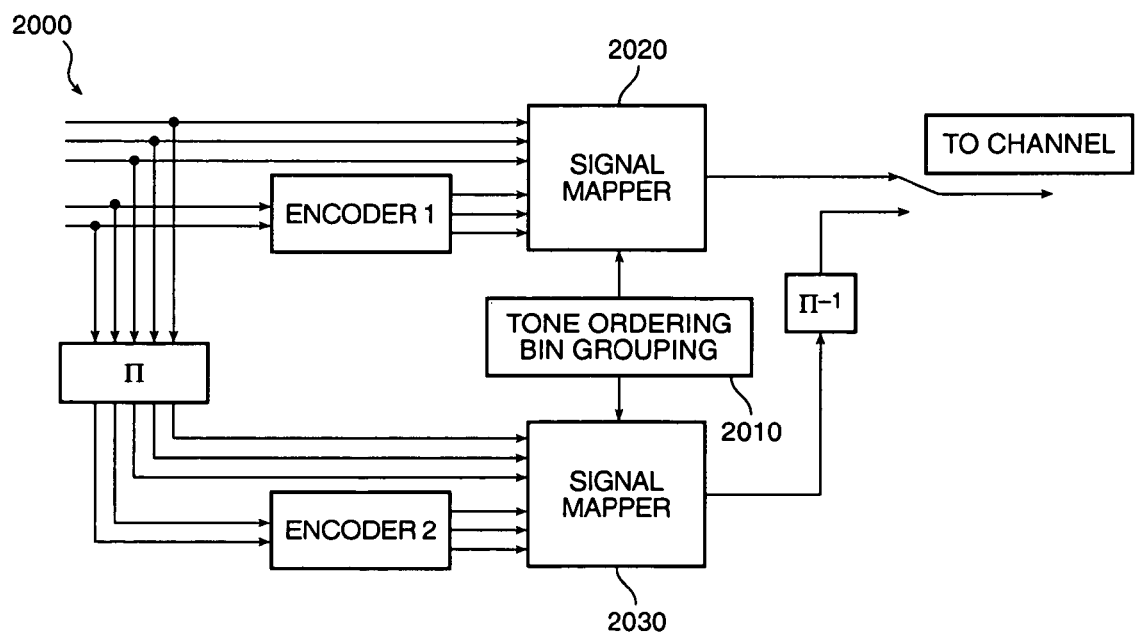
FIG. 20 is a block diagram of a turbo TCM encoder system for small constellation sizes in accordance with a preferred embodiment.

Referring to FIG. 20, there is shown a block diagram of a turbo TCM encoder system 2000 in accordance with another embodiment of the invention. This system includes a multi-dimensional constellation construction function block 2010 which enables smaller constellations to be grouped together to accommodate a minimum of 3 coded bits. The function block (i.e., tone ordering bin grouping) 2010 is introduced to order the tones based on constellation sizes and to group them accordingly to form multi-dimensional constellations. The function block 2010 interfaces with the signal mappers 2020, 2030 to control bits-to-point mapping. The bin grouping may be flexible enough to handle different bin loading scenarios. TABLE 24 lists exemplary multi-dimensional constellation construction scenarios for small constellations.

TABLE 24

Bin Group Summary
(b is the number of bits that a bin [i.e., subchannel] carries)

| Case | Grouping Scenario | Constellation Dimension |
|---|---|---|
| 1 | Four b = 1 bins | 4 |
| 2 | Two b = 1 bins and One b = 2 bin | 4 |
| 3 | Two b = 2 bins | 4 |

This embodiment of the invention may be used with many different mapping alternatives. In general, for a given encoder, the mapping scheme should give roughly the same error protection for each constellation dimension. For example, consider Case 3 from TABLE 24 above. Here, one of three coded bits from the encoders, say the bottom one, may be used to select one of the two bins and the remaining two bits may be used to select 4QAM points in each bin. The added function block 2010 allows for the construction of multi-dimensional constellations with small constellation sizes of two and four. This allows turbo codes to be applied in low SNR environments.

Although the invention has been described with reference to certain specific embodiments, various modifications thereof will be apparent to those skilled in the art without departing from the spirit and scope of the invention as outlined in the claims appended hereto and their equivalents.

What is claimed is:

1. A method of encoding a sequence of information bits in a communication system comprising:
    dividing said sequence of information bits into encoding bits and parallel bits;
    encoding said encoding bits to produce encoded bits;
    mapping said encoded bits and said parallel bits into first and second pulse amplitude modulation (PAM) signals;
    generating a quaternary amplitude modulation (QAM) signal from said first and said second PAM signals; and
    identifying whether a number of said information bits is odd or even;
    wherein said mapping is a concatenated Gray mapping; and
    said concatenated Gray mapping is a serial concatenation of an inner Gray mapping and an outer Gray mapping.

2. The method of claim 1, further comprising:
    transmitting said QAM signal from said communication system associated with said method of encoding.

3. The method of claim 2, wherein said communication system is an asymmetric digital subscriber line (ADSL) communication system.

4. The method of claim 1, comprising:
    selecting a mode of operation based on an odd or even status of said number of said information bits.

5. The method of claim 4, wherein said mode of operation determines a number of said encoding bits, a puncture pattern used in said encoding, a coding rate used in said encoding, and a number of said encoded bits and said parallel bits used in said mapping.

6. The method of claim 4, wherein said selecting is made between a first mode of operation and a second mode of operation.

7. The method of claim 1, wherein if a number of said information bits is even, a number of said encoding bits is two.

8. The method of claim 1, wherein if a number of said information bits is even, a number of said coding bits is greater than two.

9. The method of claim 1, wherein if a number of said information bits is odd, a number of said encoding bits is three.

10. The method of claim 1, wherein if a number of said information bits is odd, a number of said coding bits is greater than three.

11. The method of claim 1, wherein said encoded bits consist of systematic bits and parity bits.

12. The method of claim 11, wherein if a number of said information bits is even, a number of said systematic bits is two and a number of said parity bits is two.

13. The method of claim 11, wherein if a number of said information bits is odd, a number of said systematic bits is three and a number of said parity bits is one.

14. The method of claim 1, wherein said encoding is performed by a turbo encoder.

15. The method of claim 1, wherein said encoding is performed by multiple turbo encoders.

16. The method of claim 1, wherein said encoding is performed by a serial concatenated turbo encoder.

17. The method of claim 1, wherein said encoding is performed by a turbo product code encoder.

18. The method of claim 1, wherein said encoding is performed by an low density parity check (LDPC) encoder.

19. The method of claim 1, wherein said mapping includes:
forming a first vector and a second vector from said encoded bits and said parallel bits.

20. The method of claim 19, wherein said mapping further includes:
mapping said first vector to said first PAM signal and mapping said second vector to said second PAM signal.

21. The method of claim 19, wherein each of said first and said second vectors is formed from alternate ones of said encoded bits and said parallel bits.

22. The method of claim 21, wherin said alternate ones of said encoded bits form least significant bits and said alternate ones of said parallel bits form most significant bits of each of said first and said second vectors.

23. A method of encoding a sequence of information bits in a communication system comprising:
dividing said sequence of information bits into encoding bits and parallel bits;
encoding said encoding bits to produce encoded bits;
mapping said encoded bits and said parallel bits into first and second pulse amplitude modulation (PAM) signals; and
generating a quaternary amplitude modulation (QAM) signal from said first and said second PAM signals; and
wherein said mapping is a concatenated Gray mapping; and
said concatenated Gray mapping is a serial concatenation of an inner Gray mapping and an outer Gray mapping.

24. The method of claim 23, wherein said inner Gray mapping is applied to said encoded bits and said outer Gray mapping is applied to said parallel bits.

25. An apparatus for encoding a sequence of bits in an asymmetric digital subscriber line (ADSL) system, comprising:
a plurality of signal lines configured to divide said sequence of information bits into encoding bits and parallel bits;
at least one turbo encoder configured to encode said encoding bits to produce encoded bits; and
a quaternary amplitude modulation (QAM) unit configured to map said encoded bits and said parallel bits into first and second pulse amplitude modulation (PAM) signals and to generate a QAM signal from said first and said second PAM signals; and a control unit configured to identify whether a number of said information bits is odd or even.

26. The apparatus of claim 25, wherein said control unit is further configured to generate a mode control signal based on an odd or even status of said number of information bits.

27. The apparatus of claim 26, wherein said mode control signal is provided to said at least one turbo encoder and said QAM unit to determine a number of said encoding bits, a puncture pattern used in said encoding, a coding rate used in said encoding, and a number of said encoded bits and said parallel bits used in said mapping.

28. The apparatus of claim 25, wherein if a number of said information bits is even, a number of said encoding bits is two.

29. The apparatus of claim 25, wherein if a number of said information bits is even, a number of said coding bits is greater than two.

30. The apparatus of claim 25, wherein if a number of said information bits is odd, a number of said encoding bits is three.

31. The apparatus of claim 25, wherein if a number of said information bits is odd, a number of said coding bits is greater than three.

32. The apparatus of claim 25, wherein said encoded bits consist of systematic bits and parity bits.

33. The apparatus of claim 32, wherein if a number of said information bits is even, a number of said systematic bits is two and a number of said parity bits is two.

34. The apparatus of claim 32, wherein if a number of said information bits is odd, a number of said systematic bits is three and a number of said parity bits is one.

35. The apparatus of claim 25, wherein said at least one turbo encoder comprises at least one serial concatenated turbo encoder.

36. The apparatus of claim 25, wherein said at least one turbo encoder comprises at least one turbo product code encoder.

37. The apparatus of claim 25, wherein said at least one turbo encoder comprises a low density parity check (LDPC) encoder.

38. The apparatus of claim 25, wherein said QAM unit is further configured to form a first vector and a second vector from said encoded bits and said parallel bits.

39. The apparatus of claim 38, wherein said QAM unit is further configured to map said first vector to said first PAM signal and mapping said second vector to said second PAM signal.

40. The apparatus of claim 38, wherein said QAM unit is further configured to form each of said first and said second vectors from alternate ones of said encoded bits and said parallel bits.

41. The apparatus of claim 40, wherein said QAM unit is further configured to use said alternate ones of said encoded bits to form least significant bits and said alternate ones of said parallel bits to form most significant bits of each of said first and said second vectors.

42. The apparatus of claim 25, wherein said QAM unit is further configured to use a concatenated Gray mapping to map said encoded bits and said parallel bits.

43. The apparatus of claim 42, wherein said QAM unit is further configured to implement said concatenated Gray mapping as a serial concatenation of an inner Gray mapping and an outer Gray mapping.

44. The apparatus of claim 43, wherein said QAM unit is further configured to apply said inner Gray mapping to said encoded bits and said outer Gray mapping to said parallel bits.

* * * * *